(12) United States Patent
Krein et al.

(10) Patent No.: US 8,155,898 B2
(45) Date of Patent: Apr. 10, 2012

(54) METHODS AND APPARATUS FOR PROVIDING AN EXTREMELY FAST RESPONSE IN SWITCHING POWER CONVERTERS

(75) Inventors: Philip T. Krein, Champaign, IL (US); Grant E. Pitel, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 708 days.

(21) Appl. No.: 11/778,448

(22) Filed: Jul. 16, 2007

(65) Prior Publication Data
US 2008/0012544 A1    Jan. 17, 2008

Related U.S. Application Data

(60) Provisional application No. 60/807,411, filed on Jul. 14, 2006.

(51) Int. Cl.
*G06R 21/06* (2006.01)
*G06F 11/30* (2006.01)

(52) U.S. Cl. ............... 702/60; 702/61; 702/62; 702/182
(58) Field of Classification Search .............. 702/60–63, 702/108, 127, 130, 133, 188–191
See application file for complete search history.

(56) References Cited

U.S. PATENT DOCUMENTS

| | | | |
|---|---|---|---|
| 6,188,209 B1* | 2/2001 | Poon et al. | 323/255 |
| 2003/0006650 A1* | 1/2003 | Tang et al. | 307/43 |

\* cited by examiner

*Primary Examiner* — Phuong Huynh
(74) *Attorney, Agent, or Firm* — McDonnell Boehnen Hulbert & Berghoff LLP

(57) ABSTRACT

A method is provided for accomplishing energy changes for a power converter to minimize an impact of a disturbance. The power converter includes energy storage and switches. The method comprises determining a nature of the disturbance, evaluating an amount of energy to be added or removed from the internal storage, and computing operating times of the switches to minimize the impact of the disturbance on outputs of the power converter.

16 Claims, 20 Drawing Sheets

METHODS AND APPARATUS FOR PROVIDING AN EXTREMELY FAST RESPONSE IN SWITCHING POWER CONVERTERS

RELATED APPLICATION DATA

The present invention claims priority to a Provisional Patent Application No. 60/807,411, filed in the United States Patent Office on Jul. 14, 2006, the entirety of which is incorporated by reference herein to the extent permitted by law.

FIELD

The invention relates to power converters and, more particularly, to a method and an apparatus for providing an extremely fast response in switching power converters.

BACKGROUND

Conventional switching dc-dc converter controls are typically limited to bandwidths that are a fraction of their switching frequency. Even advanced geometric controls are generally limited by an internal slew rate of the dc-dc converter, which represents a maximum rate of change of a signal at any point in the dc-dc converter.

In conventional switching dc-dc power converters, performance is constrained by the designer to conform to models used for control analysis and design. Averaging methods, for example, presuppose switching action that is much faster than system dynamics. Small-signal models, which must be based on averaging methods since dc-dc converters can not be linearized, typically support designs for dynamic response only up to a fraction of the switching frequency.

Conventional controls use the switch duty ratio as the actuation process for closed-loop control. As is well known, a pulse-width modulation (PWM) process is a convenient way to interface a duty ratio controller with a switching converter. Disturbances, such as line and load changes, cannot be addressed more quickly than the dynamic limitations of these controllers.

Geometric controls, in contrast, work directly with dynamics. Burns et al., in "Analytic Derivation and Evaluation of a State—Trajectory Control Law for DC-to-DC controllers," published in *Record, IEEE Power Electronics Specialists Conference*, 1977, and Bass et al., in "State-Plane Animation of Power Electronic System: A Tool for Understanding Feedback Control and Stability," published in *Proceedings, IEEE Applied Power Electronics Conference*, 1980, introduced several types of geometric controls for dynamic behavior. Mossoba et al., in "Null Audio Susceptibility of Current Mode Buck Converters: Small Signal and Large Signal Perspectives," published in *Proceedings, IEEE Power Electronics Specialists Conference*, 2003, introduced designs that yield deadbeat responses to line disturbances for some classes of converters.

Modern needs for fast dynamic performance are generally motivated by fast microprocessor loads. In typical implementations, the dynamic response is enhanced by raising the switching frequency or using multiphase designs. Beyond small-signal methods, Sanders, in "Design of Ceramic-Capacitor VRMs (Voltage Regular Module) with Estimated Load Current Feedforward," published in *Proceedings, IEEE Power Electronics Specialists Conference*, 2005, showed how to apply controls that enhance dynamics, while other researchers have concentrated on the implementation of active filters for this purpose.

Converter slew rates limit the ultimate performance of known geometric controls. Since voltages and currents are subject to pre-determined limits in a converter, the rates of change of inductor currents and capacitor voltages are limited in well-defined ways. Obviously the dynamic response of a converter can be enhanced with smaller inductors and capacitors and higher switching frequencies, but other design considerations and losses place practical limits on this strategy. In the end, dynamic response of any dc-dc converter is limited by physical design considerations and constraints. As such, a tradeoff is typically considered, e.g., an inductor selected to achieve a certain ripple current inherently limits the rate of change of the load current.

In addition, fast dc-dc dynamic performance is crucial for supplying clean power to dynamic loads. This is a particular concern in low-voltage digital systems, such as microprocessors, in which fast, high-current load steps can lead to significant transients. A transient, which is a response to an imposed change, called a disturbance, is a signal that takes time to recover to the desired value, and may overshoot or undershoot the desired steady-state values. These transients often are dominated by the need to change energy stored in the power converter inductor. Disturbances have become more and more significant with higher demands from modern processors.

In the literature, a number of solutions have been proposed for reducing load-induced transients at different system levels. At the top system level, a bulk supply powers multiple loads. At the bottom system level, converters deliver power in cascade with voltage regulator modules (VRM) and point-of-load (POL) converters. A typical method to improve transient response at both system levels is to increase values of capacitance, either in the power stage or in output filters at the final load. Generally, filters need to carry the nominal power of the system and must store enough energy storage to handle worst-case load steps. However, this method tends to reduce closed-loop bandwidths and may produce voltage spikes induced by resonant loops between the output filter, supply, and conductors leading to POL converters.

Distributed power architectures, when they apply, resolve some of these issues. In a typical distributed architecture, power supplies are split into smaller modules and placed near the loads. This strategy may reduce the source-to-load impedance and the required energy storage capacity. These smaller modules regulate independently and are controlled to reject local load disturbances to the extent possible in conventional control designs. A design challenge is to reject disturbances without sacrificing bandwidth, i.e., prevent load or line changes from affecting the output, while at the same time supporting fast changes to the output voltage and current. These have presented counteracting goals in the prior art.

Moreover, most controllers typically operate without knowledge of corresponding loads, which is information that could provide advantages for controllers intended to improve transient response. The opportunity for operating with knowledge of load behavior is increasing, as more intelligent loads enter use. Efforts to reduce energy consumption and manage heat have led to a new class of deterministic loads. Even with substantial load knowledge, performance may be limited by the power converter topology. Storage elements create bottlenecks that limit converter performance. For example, in a buck converter topology, all energy must first pass through the inductor and exit through the load. Any change that requires more stored energy must first increase the inductor energy, while any change that requires less energy uses the load to remove the excess.

Various alterations to the basic dc-dc topologies have been suggested to circumvent this issue. Current sharing with interleaved or parallel converters reduces the inductance of the converter and increases conduction paths to the output. Parallel converters provide advantages similar to distributed power architectures mentioned earlier, but they share a single regulation point. Another alteration involves bypassing storage elements. This can increase power flow and, thus, dynamic response at the load. Added conduction paths have been proposed and given names such as active clamps, single shot transient suppressors (SSTS), and active filters. The addition of linear regulators in parallel with the output is equivalent to the active clamp approach. Conduction path alteration only needs to handle transient power, but does not fundamentally alter stored energy. In the sense the altered paths do not provide explicit dynamic control of stored energy changes, their impact on transient response is indirect.

Therefore, a need exists for a method and apparatus for providing fast converter controls that directly manage changes in stored energy. Methods based on geometric control techniques need to be enhanced with converter augmentation to circumvent dynamic limits to fast transient response, thereby overcoming the problems noted above and others previously experienced. These and other needs will become apparent to those of skill in the art after reading the present specification.

SUMMARY

The foregoing problems are solved and a technical advance is achieved by the present invention.

A method is provided for accomplishing fast energy change for a power converter to minimize an impact of a disturbance. The power converter includes energy storage and switches. The method comprises determining a nature of the disturbance, evaluating an amount of energy to be added or removed from the internal storage, and computing operating times of the switches to minimize the impact of the disturbance on outputs of the power converter.

In an advantageous aspect, the method determines which ones of the internal storage elements to utilize, and whether a status of each of the switches associated with the internal storage elements determined to be utilized need to be modified.

In another advantageous aspect, the method determines that augmenting the power converter with a load is needed for energy removal.

In another advantageous aspect, the method determines an operating sequence of the switches.

In another advantageous aspect, the method augments the power converter with an additional path between the input and the output of the power converter.

In another advantageous aspect, the path augmentation of the power converter provides energy removal and improves a response time to the disturbance.

In another advantageous aspect, the additional path provides a parallel phase of the power converter configured for low energy storage and for managing energy during transients resulting from the disturbance.

In another advantageous aspect, the method determines a post-disturbance steady state current and current ripple band, and determines an operation sequence to reach the post-disturbance current ripple.

In still another advantageous aspect, the method determines a post-disturbance steady state voltage and voltage ripple band, and an operation sequence to reach the post-disturbance voltage ripple.

Other systems, apparatus, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE DRAWINGS

Reference will now be made in detail to an implementation consistent with the present invention as illustrated in the accompanying drawings. Wherever possible, the same reference numbers will be used throughout the drawings and the following description to refer to the same or like parts.

Hereafter, it would be recognized that a practical dc-dc converter has an output ripple band, a tolerance range around the intended output voltage. While many power supply specifications treat average behavior and ripple behavior separately, here the ripple behavior is taken as a limiting factor. If an output voltage remains within its ripple band during converter operation, then the converter can be said to be delivering nominal output. If an output voltage remains within its ripple band in response to a disturbance, the transient response can be said to have been annulled.

A new class of controls introduced herein begins with geometric control techniques and enhances them with converter augmentation to circumvent dynamic limits. Examples are provided of buck and boost converters that have null response in the sense of ripple band to large-signal load and line changes. Even the boost converter, with its non-minimum phase operation, can respond to fast load steps without any output disturbance outside the ripple band with the methods of the present invention. An ultimate limit of the new control techniques is inherently governed by the speed with which a disturbance or change in operation can be detected and analyzed—typically much faster than other aspects of a converter. As soon as the converter control is "aware" of a disturbance, the converter control can begin an operating sequence and compute subsequent action that responds to this disturbance with no output effects outside the ripple band.

Boost, buck-boost, boost-buck, and other converter configurations with internal energy storage elements need to change their internal stored energy in response to line or load disturbances. Buck converters need to change stored energy levels in response to load disturbances. Energy changes imply slew rates: inductor current changes driven by voltage differences or capacitor voltage changes driven by current differences.

Figure 1:
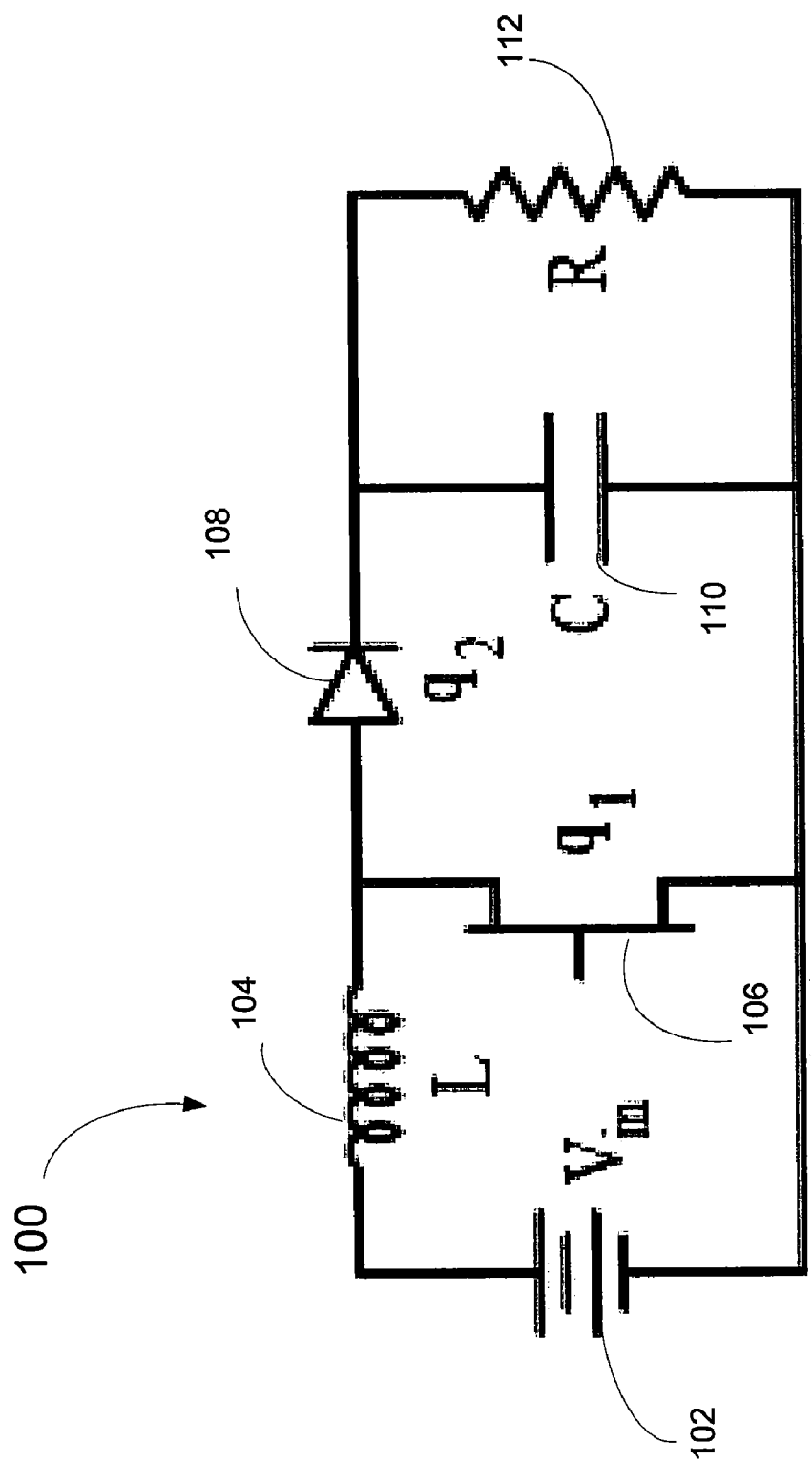
FIG. 1 illustrates a circuit diagram of an embodiment of basic boost converter in accordance with the present invention.

Now referring to FIG. 1, an example of a basic boost converter 100 is illustrated. As shown, an inductor element L 104 is connected at the output of an energy source unit Vin 102, a unidirectional switching element q2 108, such as a diode, is connected in series between the inductor element L 104 and a load R 112, and a controlled switching element q1 106 is connected in parallel with the combined energy source unit Vin 102 and inductor element L 104. In addition, a capacitor C 110 is connected at the output of the inductor element L 104 and in parallel with the load R 112. The unidirectional element q2 108 may be a field-effect transistor (FET) or metal-oxide semiconductor FET (MOSFET) rather than a diode.

As an example for a sample application, let the basic boost converter 100 be a 3 volts (V) to 12 V dc-dc converter switching at 200 kHz, with a load power range of 1 watt (W) to 12 W. Let the inductor L 104 have an inductance of 20 microhenries (μH) and the capacitor C 110 have a capacitance of 200 microfarads (μF).

Without loss of generality by ignoring losses and switch drops, a transition from 3 W to 12 W in the desired load may take the inductor current from 1 ampere (A) to 4 A, and the stored energy from 10 microjoules (μJ) to 160 μJ. Only the input level of 3 V may be available to force a current increase, and the slew rate limit is 150 kA/s. As such, even under best-case conditions, it will take 20 μs to raise the current as required, i.e., four full switching periods.

To circumvent dynamic limits and steady-state performance tradeoffs, converter augmentation adds degrees of freedom that support fast energy changes. The augmentation circuits of this invention are somewhat like snubbers, which are simple electrical circuits used to suppress ("snub") electrical transients. Snubbers are frequently used with an inductive load where a sudden interruption of current flow may lead to a sharp rise in voltage across the device creating the interruption. This sharp rise in voltage might lead to an undesired transient or permanent failure of the controlling device.

The method of the invention is similar in principle to a snubber: redirect energy flows during a short interval to improve system-level performance. Converter augmentation is an important step but may also be insufficient. As such, geometric control designs are introduced herein to work with augmented converters to substantially minimize or even null disturbances. Large line and load steps are considered for buck and boost converters, and in each case techniques are provided to show how to respond within output voltage ripple limits.

In the case of snubbers, augmented converters may use either lossy or energy recovery techniques. Small dc-dc converters usually are best served by lossy designs since they are simple and easy to implement. At higher power levels, augmentation can be implemented with energy recovery to enhance system efficiency.

A problem to be considered is whether digital-based control techniques, combined with augmentation, can substantially minimize or even completely cancel line and load step disturbances in basic dc-dc converters. Since a converter always has output ripple, a response that remains within ripple limits before, during, and after a large-signal transient disturbance can be said to represent a null response in which the large disturbance is completely cancelled.

There are many ways to augment converters. For example, during an operation of the basic boost converter 100, one may be tempted to use some a higher voltage auxiliary supply, and switch over to it briefly to increase the slew rate. This strategy is possible in applications such as personal computers in which other supply levels are present, but only provides limited improvement. Another tempting approach is to provide alternative energy paths with separate converters. A switch that provides an energy path across a flyback converter can deliver energy directly from input to output, but compromises the advantages of the converter topology. As know in the art, a flyback converter is a dc-dc converter with a galvanic isolation between the input and the output(s). More precisely, the flyback converter is a buck-boost converter with the inductor split to form a transformer, so that the voltage ratios are multiplied with an additional advantage of isolation.

The augmentation forms to be discussed hereafter are configured to preserve the converter topology, although this is not a limiting factor of the methods of the invention. To formulate the preferred embodiment of the invention, the following constraints are imposed:

No additional power supplies or switched-capacitor circuits can be considered.
  The augmentations must preserve converter topology.
  Non-minimum phase behavior in boost-family converters is also preserved. This is to maintain isolation in flyback topologies and to avoid undesired failure modes.

Extra switches or converter phases can be used for augmentation. Any extra converter phases need to use the same topology as the main circuit.

It is assumed that fast sensing and ample computational power are available for the controls.

Solutions that are lossy during the transient are permitted.

For purposes of this discussion, the converter switching frequency will be held fixed, although switches in the augmentation may function asynchronously during the transient.

As will be seen, given these constraints, solutions exist that can deliver null response to disturbances.

As is well known, techniques to change energy levels on a dynamic basis need to either inject or remove energy, and there can be associated losses or complexities associated with energy recovery. Consider again the basic boost converter 100 of FIG. 1, in steady state. When a line step increase occurs, a new steady state average condition involves a lower inductor current through inductor L 104 and therefore a lower stored energy. The extra energy needs to be removed, but the only part of the system that consumes energy is the load R 112. Thus, the extra energy needs to be dissipated in the load R 112. Moreover, the load R 112 can not dissipate extra energy if its voltage is tightly regulated.

In a conventional small-signal closed-loop design, this extra energy removal can result in a gradual process of energy removal over many cycles as the control system (not shown) connected to the basic boost converter 100 makes a dynamic transition from one steady state to another steady state. However, in a geometric controller, this process is accelerated by decreasing the boost converter 100 net input energy for a time until nominal load power consumes the excess stored amount.

A faster control can take one of the following response techniques to disturbances:

1. Turn off the active switch q1 106 and wait for a specific or predetermined time until the energy of the inductor L 104 reaches a new target value. If the output capacitor C 110 is large enough to absorb the extra energy without moving outside the specified ripple band, this simple technique leads to null response without augmentation.
2. Augment with extra elements that can recover some of the inductor energy and deliver it back to a source.
3. Analogous to a lossy snubber, augment with extra load to dissipate the excess energy.
4. Augment with a parallel phase designed for low energy storage, and use it to manage energy during transients.

The first technique can be limited by slew rates. The second technique can take the form of a separate converter to deliver energy from the inductor L 104 to the load R 112, a set of switches to reverse the inductor current back into the source, or added switched capacitor arrangements. Hereafter, only the third and fourth techniques are considered, but still other techniques based on various known energy-recovery snubber circuits can be applied to convert lossy approaches into energy recovery methods.

The augmentation methods of the present invention are arranged as follows:

1. For any given dc-dc converter, provide an augmented load and switch. These components will be used in transient situations that require energy removal.
2. For a buck converter, there is an added advantage of an existing input voltage source higher than the output. The topology is preserved if a switched path from input to output is added. This is useful when the need is to increase the inductor energy, since the augmented path can support the load R 112 while the energy of the inductor L 104 increases.
3. For the boost converter 100 or other non-minimum phase topology, the process of increasing stored energy is effectively separate from the process of delivering energy to the load. In these circuits, the preferred augmentation takes the form of an extra phase to support the load R 112 during the transient energy process.

Figure 2:
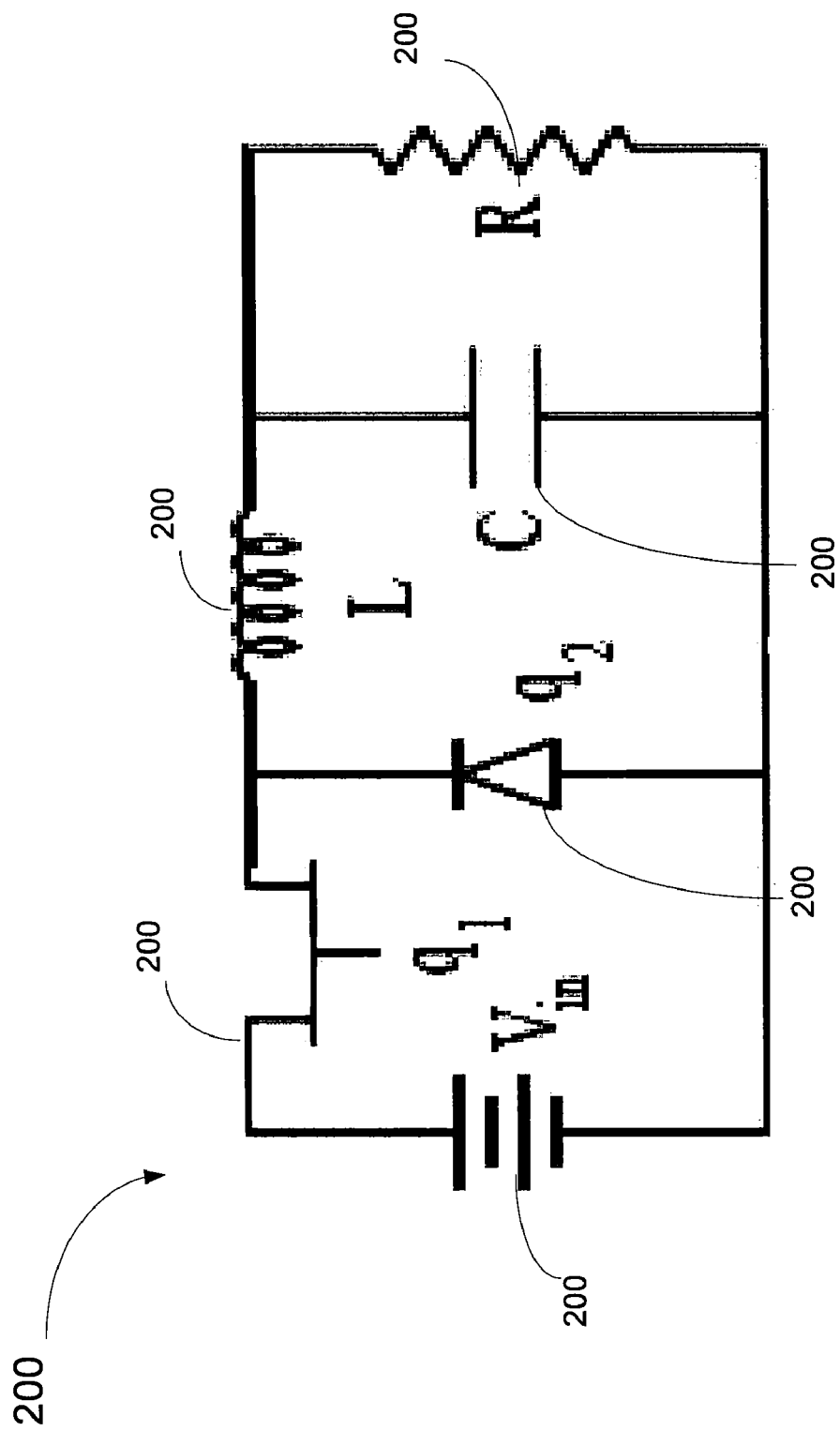
FIG. 2 illustrates a circuit diagram of an embodiment of a basic buck converter in accordance with the present invention.

Now referring to FIG. 2, an example of a buck converter 200 is illustrated. As shown, an a switching element q1 206 is connected at the output of an energy source unit Vin 202, an inductor element L 204 is connected in series between the switching element q1 206 and a load R 212, and a unidirectional switching element q2 208, such as a diode, is connected in parallel with the energy source unit Vin 202 and the controlled switching element q1 206. In addition, a capacitor C 210 is connected at the output of the inductor element L 204 and in parallel with the load R 212. The unidirectional element q2 208 may be a field-effect transistor (FET) or metal-oxide semiconductor FET (MOSFET) rather than a diode.

The case of a null response to a step in line voltage in the buck converter 200 depicted in FIG. 2 is closest to conventional performance possibilities. Since the average steady-state inductor current and capacitor voltage in the buck converter 200 are functions only of the load, no large energy slews are required in the buck converter 200 in response to a line step. However, subtle energy changes are required. Typically, a converter ripple waveform is slightly different before and after a line step. If no correction is made to the instantaneous stored energy, the change in energy may excite a second-order transient in the output LC filter of the buck converter 200.

Figure 3:
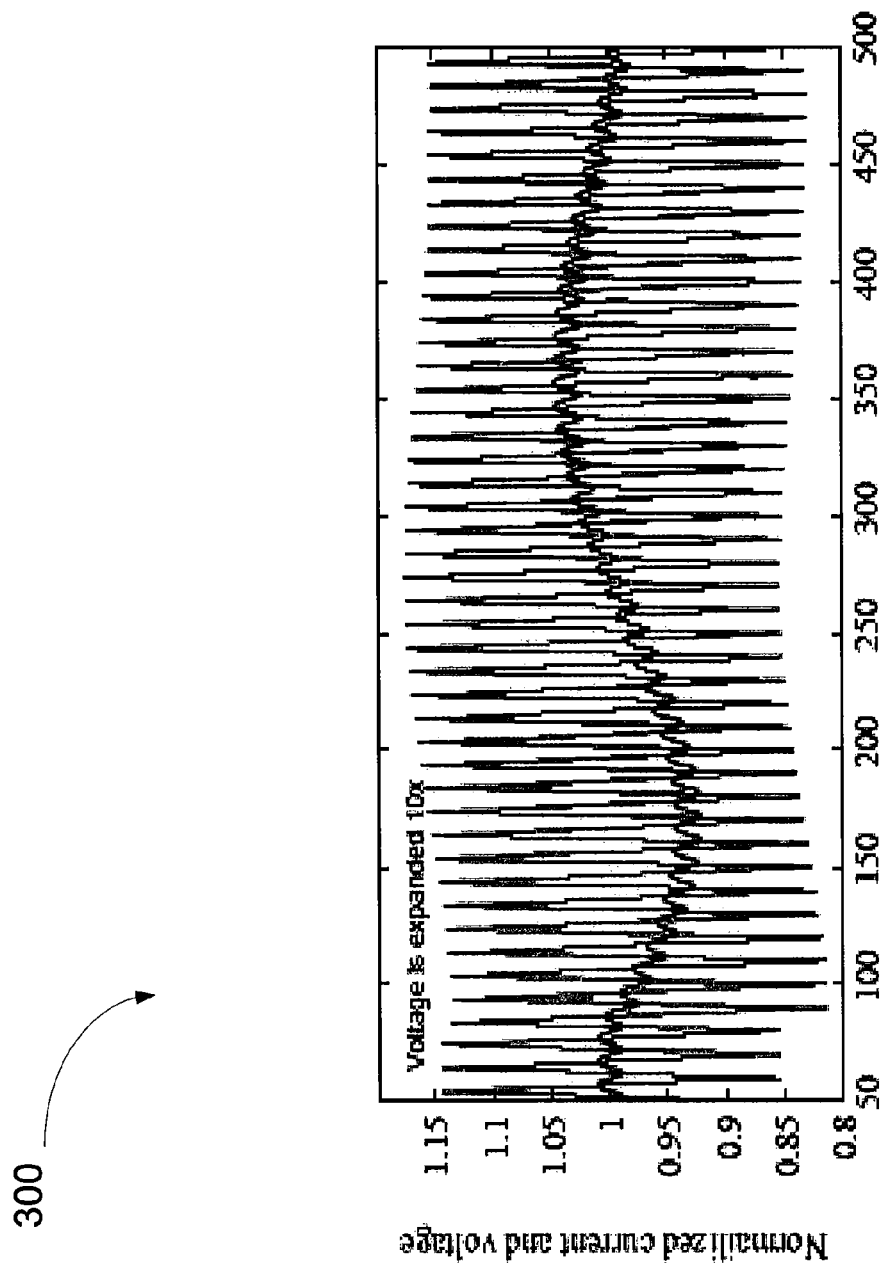
FIG. 3 is a graph illustrating a line step response of the buck converter of FIG. 2 given instant change to a new duty ratio.

To illustrate the problem, let the inductor L 204 have an inductance of 2 μH, the capacitor C 210 have a capacitance of 1800 μF, the load resistance R 212 have a resistance of 0.1., the input voltage Vin be equal to 12 V, and choose an output reference Vref=5 V (not shown) at the load resistance R 212 for the buck converter 200. A switching frequency of 100 kHz is used, and switch q1 206 is modeled as a substantially ideal switching element. In FIG. 3, the graph shows the time response of this buck converter 200 to a disturbance of a line step increase from 12 V to 14 V at a time of 82 microseconds. The active switch duty ratio is set to exactly Vref/Vin, and changes instantly to the new correct value when the line step occurs. The graph of FIG. 3 shows a current normalized to a nominal value of 50 A (the triangle), and an output voltage, normalized to 5 V and expanded by a factor of ten to emphasize ripple and the disturbance. Even though the duty ratio always has a substantially correct steady-state value, second-order ringing generates a long transient well outside the ripple band.

Figure 4:
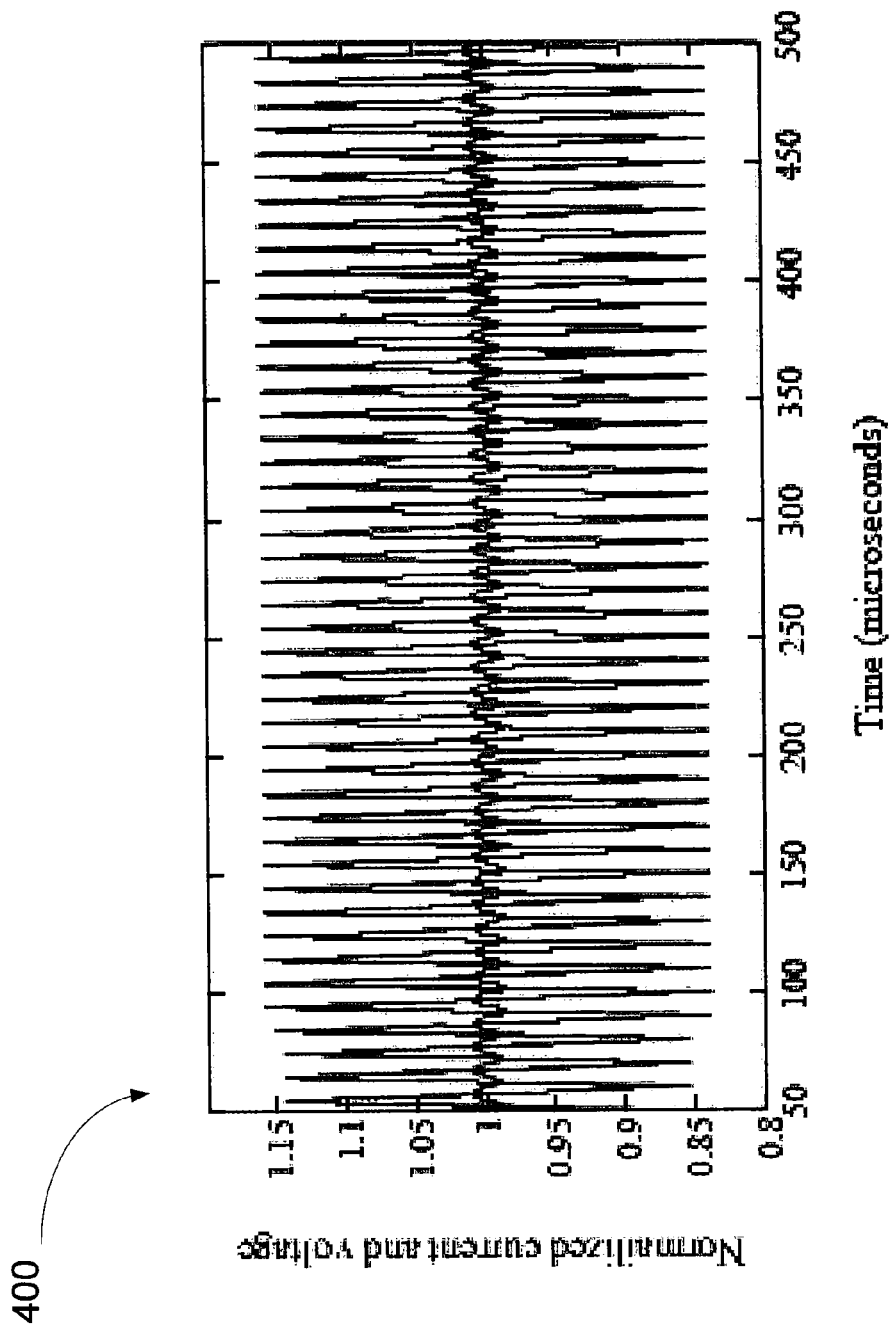
FIG. 4 is a graph illustrating a line step response of the buck converter of FIG. 2 with a control as taught in the present invention, achieving an effective null response.

A null response can be generated with a few computations if the disturbance is sensed. Before the line step, the input voltage Vin is 12 V and the output Vref is 5 V. The average inductor current is 50 A with this load of 0.1Ω. A linear ripple approximation can be used to show that the pre-disturbance ripple current is about 14.58 A peak to peak, with a minimum of 42.71 A at the instant of time the active switch q1 206 turns on and a maximum of 57.29 A when the switch q1 206 shuts off. An input voltage sensor can track the input, and can detect the 14 V input voltage after the step change. Linear ripple shows the new steady-state ripple at a current of 16.07 A peak to peak, with a minimum of 41.96 A and a maximum of 58.04 A. The converter 200 can recover to steady state if the current at a time of 90 us is this new minimum, 41.96 A. Since the ripple is linear and the slopes are easy to find, it is straight-forward to compute that this objective is achieved if the switch q1 206 turns off at 83.75 μs. As such, a controller (not shown) associated with the buck converter 200 can make use of about 1.75 µs to sense the state change and compute this result. The associated control performance is shown in FIG. 4. The change in current ripple after 82 µs is apparent, but the disturbance is rejected completely at the output. The output response in FIG. 4 does not exceed the ripple band, so in a large-signal sense, the response to this line step disturbance is substantially zero.

Figure 5:
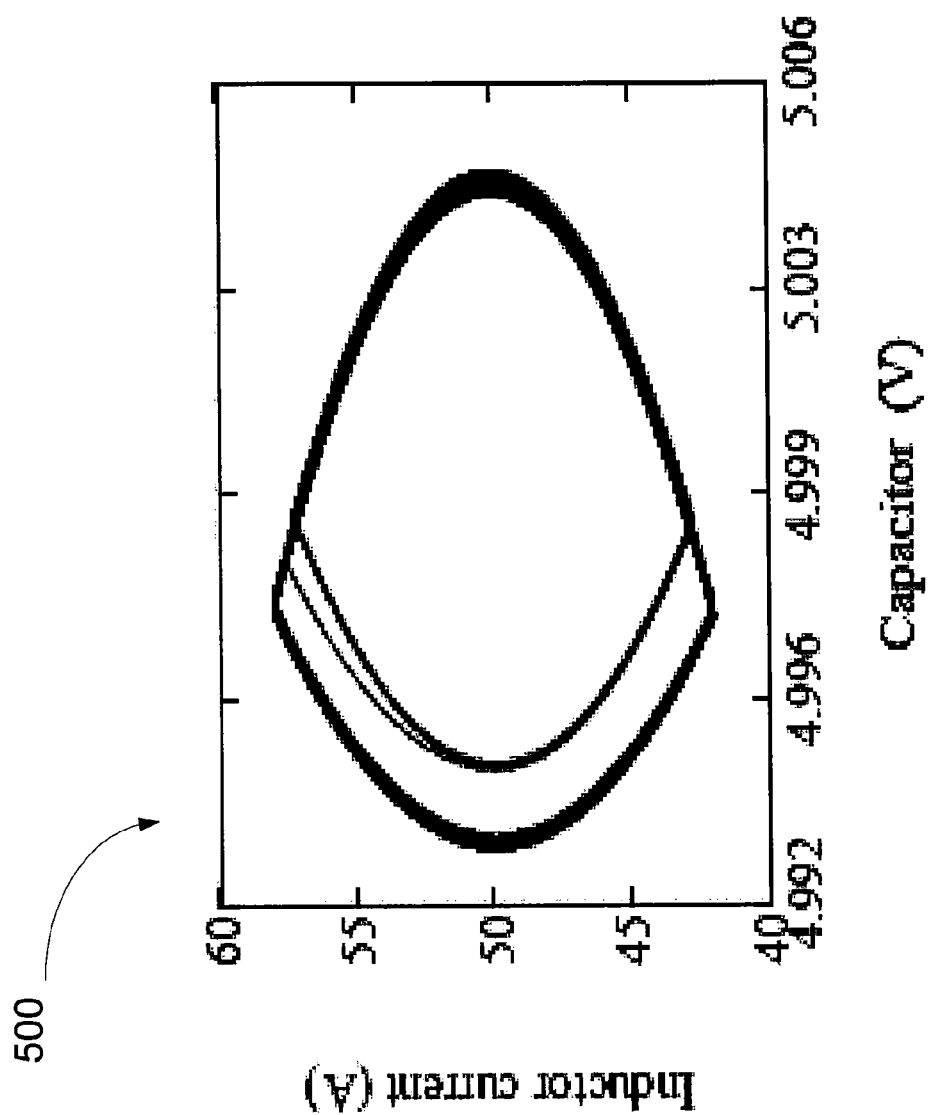
FIG. 5 is a graph illustrating a phase plane plot of about ten cycles around the line disturbance shown in FIG. 4.

A useful tool for evaluation of performance is a phase-plane plot, as in FIG. 5. This phase-plane plot shows the graph of inductor current vs. capacitor voltage through the transient. The plot shows about 10 limit cycles centered around the disturbance, with switch turn-off corresponding to vertices at the top of the plot and switch turn-on to vertices at the bottom of the plot. The plot also shows that the 83.75 µs switch operation occurs just as the disturbed trajectory reaches the new steady-state limit cycle. The timing is "just right" to catch the new limit cycle and carry on in the immediate new steady state.

A disturbance due to a line step decrease is handled in the same manner: the disturbance is sensed, and a new switch time is computed to bring the current as close as possible to the computed new limit cycle. In the example of FIG. 4, this is convenient because switch action occurs some time after the disturbance. A simple algorithm can find the new switch time and take the appropriately necessary action.

However, if instead the disturbance occurs too late in a cycle to support exactly the right time, then three situations can be identified:

The disturbance occurs early in the cycle, while the active switch q1 206 is on, and the right time for a switch action occurs subsequently.

The disturbance occurs while the active switch q1 206 is on but the nature and timing of the disturbance is such that it is too late for action.

The disturbance occurs when the active switch is off.

The first situation has been addressed in the example of FIG. 4. When the buck converter 200 is utilized, the third situation is straightforward. That is, the disturbance may have no effect until the active switch q1 206 turns on, so the disturbance can be treated as occurring at the beginning of a subsequent cycle. The third situation then becomes the same as the first situation. In the second situation, a suitable strategy is to turn off the active switch q1 206 as soon as the disturbance is detected, then make the correction in the next cycle.

In all these situations (and including line decreases), real-time calculation can identify the right switching time to null the response. No converter augmentation was required, but voltages and slopes were needed for the algorithm of the controller. As such, a digital process can monitor operation continuously, and compute the switching time for each cycle. The process can be difficult in an analog setting since numerical estimates of minimum and maximum ripple currents are needed in the computation. However, since ripple can be well-represented as piecewise linear, the arithmetic involved is simple and direct, and there are no apparent barriers to real-time implementation.

Fast response of the buck converter 200, for example, to load steps is a topic of wide interest, given extreme requirements of modern microprocessors. In contrast to the line step case, a load step affecting the buck converter 200 requires a change in stored energy in the inductor element L 204. This means that the buck converter 200 may need to be augmented to provide extra energy sink and source paths to deliver a fast response. As an example, an augmented buck converter 600 is shown in FIG. 6.

Figure 6:
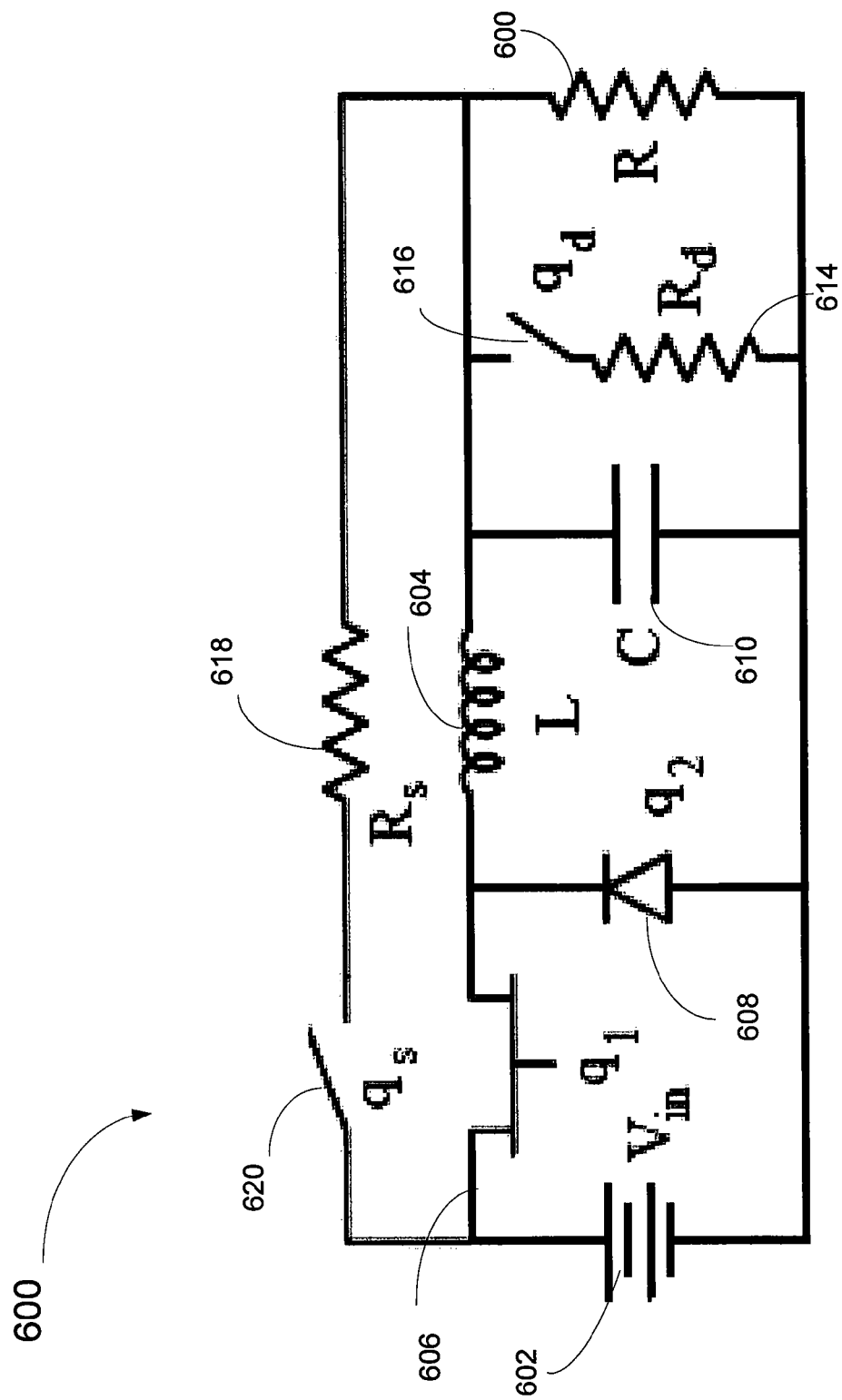
FIG. 6 is a circuit diagram illustrating an embodiment of an augmented buck converter in accordance with the present invention.

As shown in FIG. 6, a switching element or switch q1 606 is connected at the output of an energy source unit Vin 602, an inductor element L 604 is connected in series between the switch $q_1$ 606 and a load R 612, and a unidirectional element q2 608, such as a diode, is connected in parallel with the energy source unit Vin 602 and the switch q1 606. In addition, a capacitor C 610 is connected at the output of the inductor element L 604 and in parallel with the load R 612. The unidirectional element L 608 may be a field-effect transistor (FET) or metal-oxide semiconductor FET (MOSFET). In addition, a resistance or resistor Rd 614 is connectable in parallel to both the capacitor C 610 and the resistance R 612 via a switch $q_d$ 616, and a resistance or resistor Rs 618 is connectable in parallel with the switch q1 606 and the inductor element L 604 via a switch $q_s$ 620.

The resistor Rs 618 and its associated switch qs 620 provide an energy delivery path to the load that allows it to be supported during times when the inductor energy is to increase. The resistor Rd 614 provides a parallel sink path to decrease the inductor energy while minimally or even without disturbing the output.

Let us consider first a load decrease with the same parameters as used in FIG. 4. Energy must be removed from the inductor L 604, and $R_d$ 614 needs to be brought on line via the switch $q_d$ 616 to provide this energy removal, since the load is not to be used. For example, let the initial load be 0.1Ω (nominally 50 A). At a time of 82 µs, the load R 612 changes to 0.25Ω. Before the load change, the current has an average value of 50 A with minimum and maximum of 42.71 A and 57.29 A. After the change, the current average drops to 20 A, with a minimum of 12.71 A and a maximum of 27.29 A. Ignoring ripple, the initial energy storage is ½Li²=2.5 mJ and the final energy storage is 0.4 mJ. The resistor Rd 614 should dissipate 2.1 mJ during the transient. Ideally, Rd 614 can be adjustable, but to simplify the implementation, Rd 614 is set here to 0.25Ω and the operating duration of its associated switch $q_d$ 616 provides the necessary degree of control freedom. The parallel combination of this resistor $R_d$ 614 and the new load dissipates energy at the rate of 200 W. That is, energy of 2.1 mJ is dissipated in 10.5 µs.

At the instant the disturbance is detected, the controller shuts off the active switch $q_1$ 606 and turns on the switch $q_d$ 616 to initiate energy reduction. The current is 49.71 A at 82 µs, and needs to drop as much as 30 A. The slew rate is limited, however, since the output voltage is to stay constant and the active switch $q_d$ 606 is off. The inductor voltage is −5 V, and its current falls at a rate of 2.5 A/µs. By the end of the first cycle, the current should decrease by 20 A to 29.71 A. This is still too high, so the action needs to continue in the second cycle. The next current target becomes a current of 12.71 A at a time of 100 µs. The switch $q_d$ 616 is kept on for 9.9 µs during this process rather than 10.5 µs to account for energy needed in the output capacitor. To reach a current level of 12.71 A, the active switch $q_1$ 606 is turned on at 90 µs and off at 91.33 µs.

Figure 7:
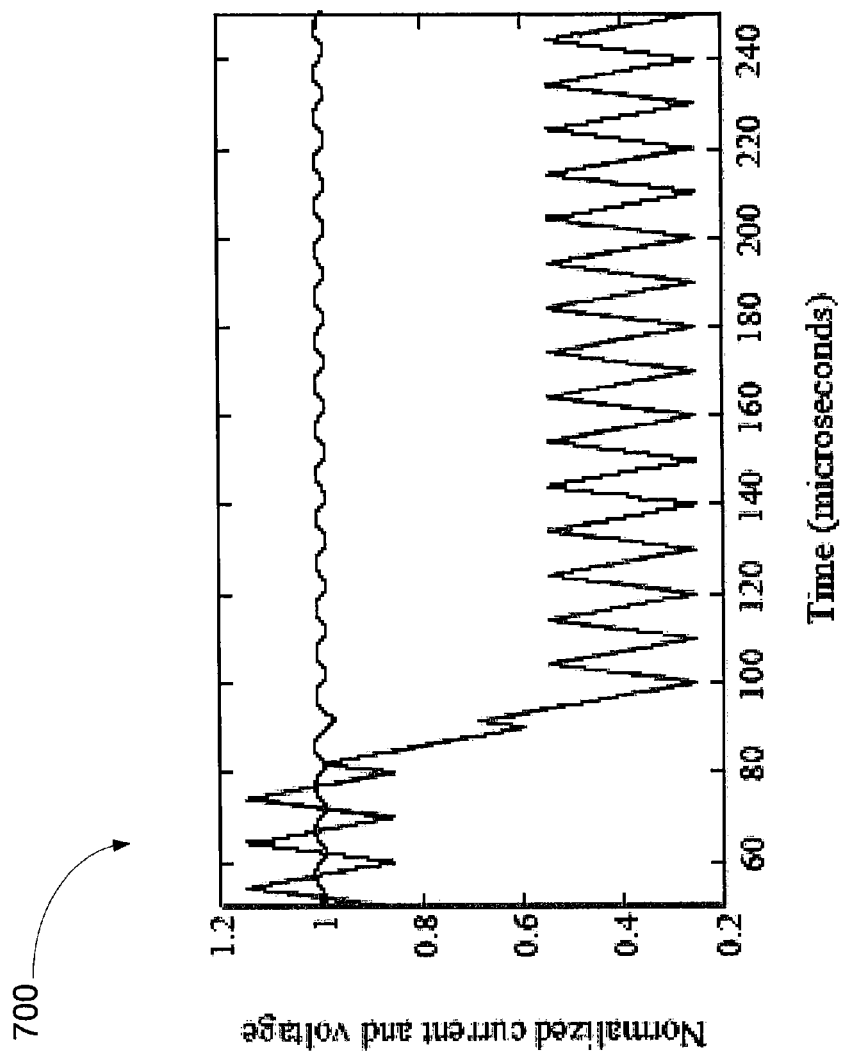
FIG. 7 is a graph illustrating responses of normalized current and voltage for a buck converter step load decrease with a control as taught in the present invention.
Figure 8:
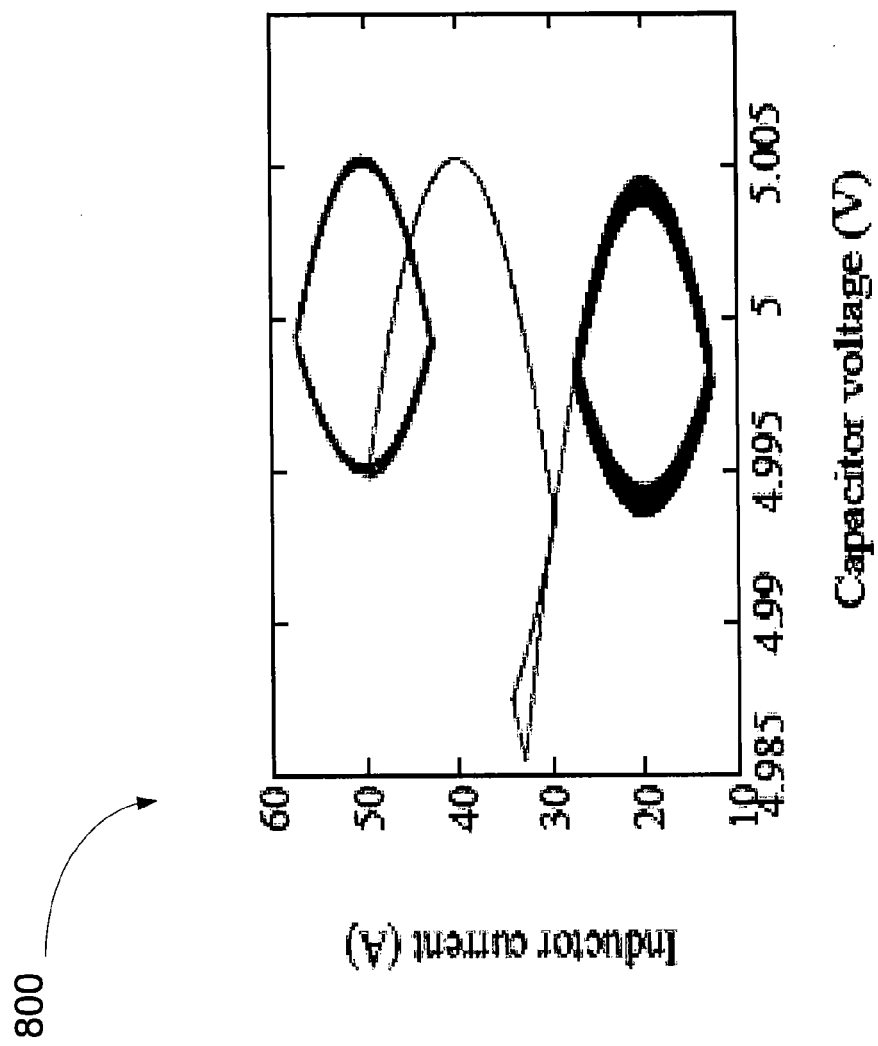
FIG. 8 is a graph illustrating a phase plane plot of an inductor current vs. a capacitor voltage for the step load decrease of FIG. 7.

Results of this technique are illustrated in the time domain graph of FIG. 7. The normalized scales are the same as in FIG. 4. The performance again shows substantially a null response. This load slew, with no slope limit, has not moved the output voltage out of a ripple band. FIG. 8 shows the corresponding phase plane plot. In this case, the new limit cycle is reached almost exactly and the system is essentially in the new steady state immediately. A final limit cycle is reached by the end of the second cycle with minimal output change.

A buck converter load increase needs the resistor $R_s$ 618 to be brought on rather than the resistor $R_d$ 614. In this case, a strategy is to supply the extra current in the larger load while the active switch $q_1$ 606 stays on to increase the inductor stored energy. In this case, the load steps from 0.1Ω to 0.05Ω at a time of 82 μs. When this load change is detected, the active switch $q_1$ 606 is held on for the duration of the period and the switch $q_{l1}$ 620 also switches on. In the 8 μs that remain in the period, the current increases by 28 A. But since the load increase is 50 A, the result is insufficient at 90 μs. The operation should be computed to reach the correct current at 100 μs. The average inductor energy is to increase from 2.5 mJ to 10 mJ, so 7.5 mJ must be injected into the inductor L 604. The new load is using energy at the rate of 500 W, but immediately after the load step the buck converter 600 is operating to deliver 250 W.

As such, the resistor $R_s$ 618 delivers energy around the inductor L 604 to the load. If its value and switch timing are selected properly, the output capacitor C 610 is kept charged and prevent significant voltage excursion during the process. Thus, an obvious choice is to deliver the entire extra 50 A around the inductor L 604, which needs the resistor $R_s$ 618 to be equal to 0.14Ω. However, this evaluation may be too approximate and may cause an excessive voltage swing. Instead, a more complete analysis, based on average values and linear ripple, during the interval from 82 μs to 90 μs, can be obtained, as follows:

Energy injected from the input source through the conventional power path:
integrate 12 V times the inductor current over 8 μs to get 5.86 mJ.
Energy used by the load: 5 V×100 A×8 μs=4 mJ.
Energy storage added to the inductor L 604, which is obtained by integrating the ripple, is as follows: 3.56 mJ.
Deficit: Energy needed by the load plus energy stored less energy from source is: 1.7 mJ.

With the resistor $R_s$ 618 switched in, extra energy to the load is given as 5 V×$I_{Rs}$×8 μs. An extra energy storage of 1.7 mJ needs a current $I_{Rs}$=42.5 A. Since the drop across the resistor $R_s$ 618 is 7 V, this requires the resistor $R_s$ 618 to have a resistance of 0.165Ω to meet the requirements.

During the cycle from 90 μs to 100 μs, the objective is to switch so as to reach the new minimum current, 92.71 A, at t=100 μs. The current at 90 μs is 77.71 A in this analysis. This current value is less than the final current target value of 92.71 A. The energy that still needs to be added to the inductor L 604 is about 2.56 mJ. The correct current value can be achieved if the active switch $q_1$ 606 shuts off at 96.67 μs. What about energy injection? If the shut-off time is at 96.67 μs, the switch $q_1$ 606 will be on 2.5 μs longer than in steady state. The inductor L 604 is charged for an extra 2.5 μs and avoids discharge for an extra 2.5 μs. The extra net energy into the inductor L 604 is 7 V×77.71 A×2.5 μs+5 V×77.71 A×2.5 μs, or 2.33 mJ. The deficit is 0.23 mJ. If $R_d$ 616 is kept on for a brief additional time, then the inductor L 604 delivers 5 V×42.5 A×t extra to the load, so 0.23 mJ requires 1.08 μs.

The entire operating sequence for this example is as follows:
1. The load change is detected at 82 μs. The active switch $q_1$ 606 is held on, and the switch $q_{l1}$ 620 is activated.
2. Based on measured data, the new steady-state load current is computed. Given $R_s$=0.165Ω, each switch remains on for the remainder of the cycle.
3. The current at 90 μs is computed, along with the remaining energy deficit. The algorithm determines that $q_d$ 616 should shut off at 91.08 μs and the active switch $q_1$ 606 should shut off at 96.67 μs.

Figure 9:
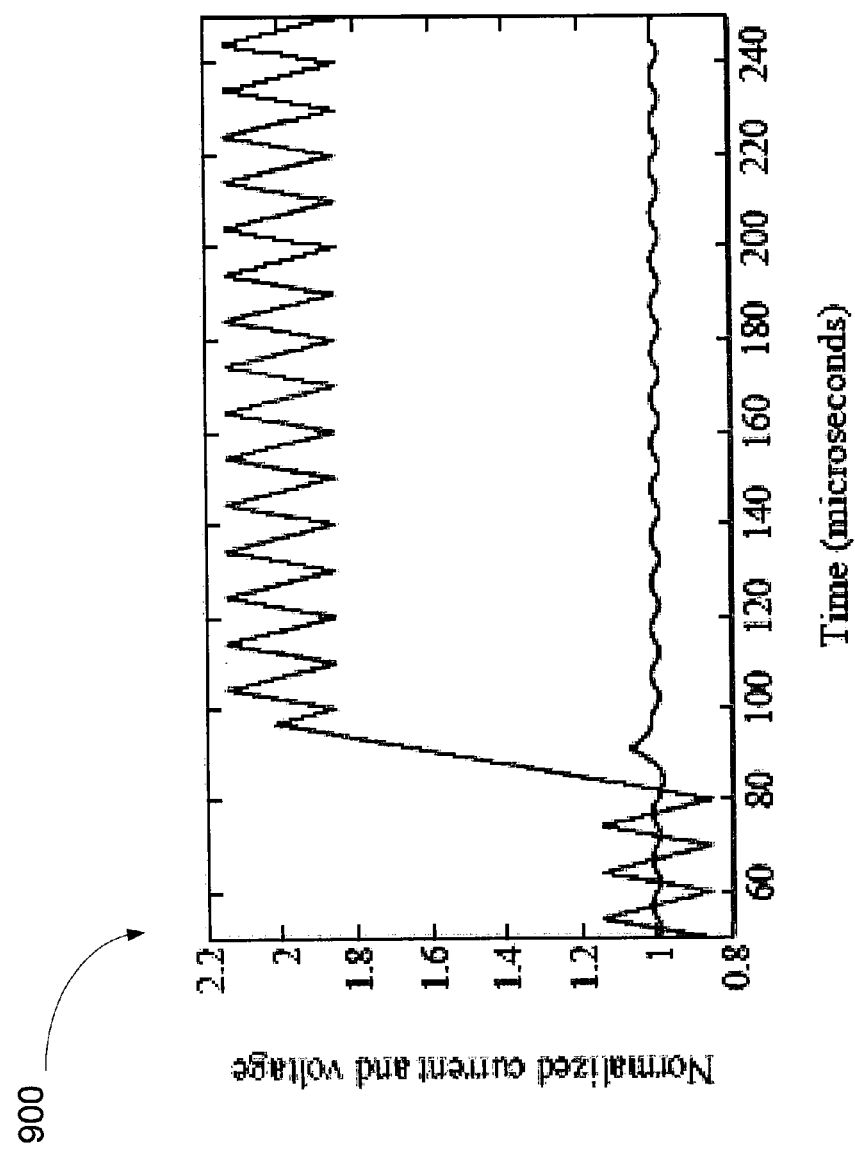
FIG. 9 is a graph illustrating responses of an inductor current and an output voltage to a 100% load step increase in the augmented buck converter of FIG. 6.
Figure 10:
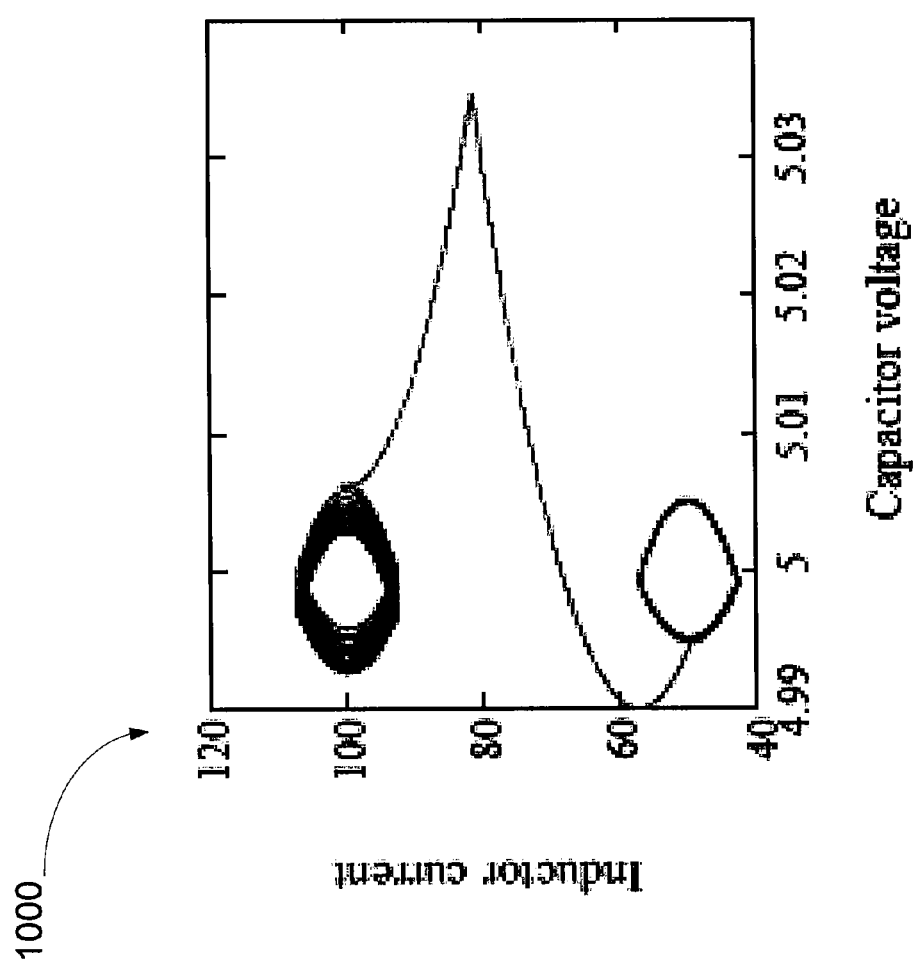
FIG. 10 is a graph illustrating a phase plane plot of the induced current vs. the capacitor voltage for the step load increase of FIG. 9.

FIG. 9 shows the time domain trace for this situation. As shown, there is a small voltage overshoot at 90 μs (about 0.7%) which can be corrected with a slightly larger resistor $R_s$ 618. In a practical implementation, the switch $q_s$ 602 can switch on and off a few times during the first cycle to get a more "fine-tuned" variable effective value of $R_s$ 618. The corresponding phase plane plot in FIG. 10 shows that indeed this control is bringing the system very close to its final limit cycle at 100 μs.

The augmented response process introduces some losses. For the load increase example, the loss in $R_s$ 618 is about 2.7 mJ per event. For this 500 W converter, up to 2000 events per second can be handled before there is a one point decrease in system efficiency. The resistor $R_s$ 618 can be replaced with a switched capacitor arrangement or separate power converter to reduce losses.

Boost converters and related circuits have an inherent non-minimum phase behavior, which thus cannot be eliminated while maintaining the same topology. The reason is that energy flow proceeds in a step-wise manner: When the active switch $q_1$ 606 is on, energy is delivered to the input inductor, which is also decoupled from the load. When the active switch $q_1$ 606 is off, energy can be transferred to the load. Any increase in energy delivery to the load requires a time interval in which the load is served only by the capacitor C 610, and therefore by a storage element with decreasing energy. There is always a delay involved in altering the energy flows. As is well known, this behavior imposes limits on dynamic response. The only reasonable prior known way to enhance dynamics is to increase the switching frequency.

Augmentation under the constraints stated above can not violate the boost topology. However, augmentation methods that provide ideal response still can be arranged. In the boost converter 100, line increases and load decreases both require removal of energy from the inductor L 104. Analogously to the buck converter 600, this can be accomplished by turning off the active switch $q_1$ 106 such that the inductor L 104 is connected to the output, and augmenting the load with a separate resistor to absorb the excess energy.

Line decreases and load increases, which require energy to be added to the inductor L 104, are more problematic for the boost converter 100. Given that topology violations are ruled out in the preferred embodiment, energy increase requires the active switch $q_1$ 106 to turn on, which decouples the load. How can the load be maintained during the energy increase process? One reasonable solution is to use a second boost converter phase, with oversized capacitor and essentially no load. In steady state, this phase acts only to maintain the desired output voltage on its capacitor, plus a small extra voltage to account for possible equivalent series resistance (ESR) drop. When a transient is detected that requires an energy increase, an additional switch can connect this second phase of the boost converter in parallel with the boost converter 100. As such, the extra capacitance maintains the load during the energy increase process, then the second phase of the boost converter goes back off line. A basis for using a second phase of the boost converter rather than simply increasing the output capacitance is that the separate second phase does not compromise dynamic performance in any manner. Furthermore, the extra second phase can use low-cost conventional capacitors. There is no need for low ESR or other special properties since the phase acts only briefly and will not see polarity changes across the corresponding ESR.

Figure 11:
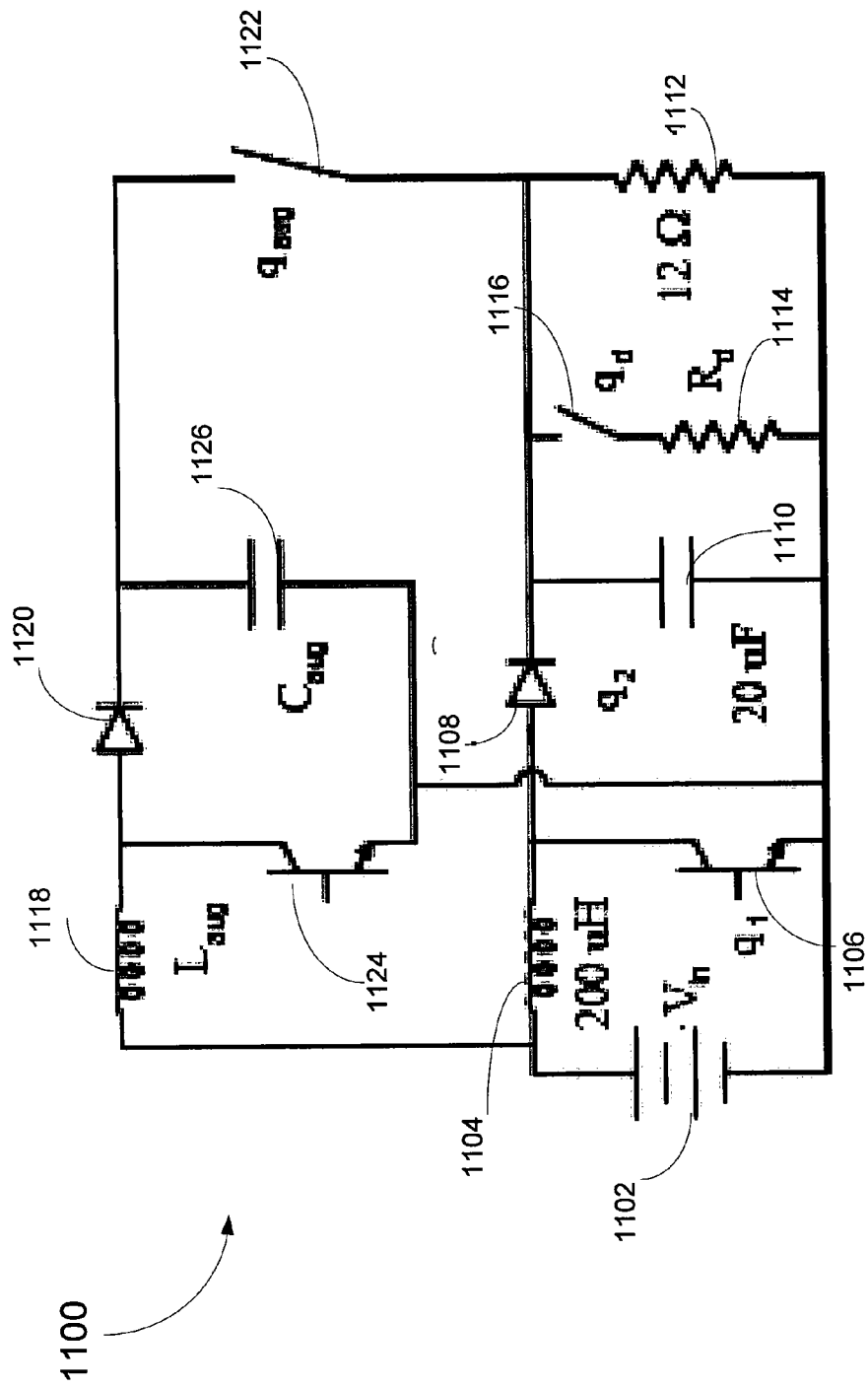
FIG. 11 illustrates a circuit diagram of an embodiment of a boost converter with an energy augmentation circuit in accordance with the present invention.

Now referring to FIG. 11, an example of an augmented boost converter 1100 is illustrated. As shown, an inductor element L 1104 is connected at the output of an energy source unit Vin 1102, a unidirectional element $q_2$ 1108, such as a diode, is connected in series between the inductor element L 1104 and a load R 112, and a switching element $q_1$ 1106 is connected in parallel with the combined energy source unit Vin 1102 and the inductor element L 1104. In addition, a capacitor C 1110 is connected at the output of the inductor element L 1104 and in parallel with the load R 1112. In addition, a resistor Rd 1114 is connectable in parallel to the capacitor C 1110 and the load R 112 via a switch $q_d$ 1116. Further, in an extra phase of this augmented boost converter 1100, an inductor element $L_{aug}$ 1118 is connected at the output of an energy source unit Vin 1102, a unidirectional element $q_3$ 1120, such as a diode, is connected in series with the inductor element $L_{aug}$ 11 and with the R 112 via a augmentation switch $q_{aug}$ 1122, a switch $q_3$ 1124 is connected in parallel with a capacitor $C_{aug}$ 1126 with the inductor $L_{aug}$ 1118 therebetween. The unidirectional element $q_3$ 1108 may be a diode, field-effect transistor (FET) or metal-oxide semiconductor FET (MOSFET).

The boost converter 1100 is augmented for a line increase situation. For example, consider a case in which the rated power is 12 W, the converter 1100 is designed for 5 V to 12 V voltage step-up, and switches at a fixed frequency of 100 kHz. The output ripple band is 3%—a width of 0.36 V. The parameter values given achieve slightly less than 0.3 V peak-to-peak output ripple at nominal load. The load augmentation resistor $R_d$ 1114 can be pre-selected or the effective resistance can be set through the use of fast PWM in the augmentation switch $q_d$ 1116.

Now consider the operating sequence for a line step disturbance, with infinite slew rate, from 5 V to 6 V at time t=42 µs:

1. The step is detected almost immediately by an input voltage sensor (not shown).
2. If the active switch $q_1$ 1106 is on, it immediately turns off, and switch $q_d$ 1116 turns on.
3. A digital control (not shown) computes the new steady-state current and current ripple, then computes a switch timing sequence to reach the new current value at a cycle boundary.
4. The augmentation switch $q_{aug}$ 1122 is controlled in accordance with the computed sequence to constrain overshoot and undershoot to the ripple band.

In FIG. 11, the inductor L 1104 has an inductance of 200 µH, the capacitor C 1110 has a capacitance of 20 µF, and the resistor R 1112 has a resistance of 12Ω. With these example element values in FIG. 11 and a Vin input of 6 V, the inductor voltage is at −6 V after the step change with the active switch $q_1$ 1106 off. The current falls at 30 kA/s or 0.3 A per cycle. The initial average current is 2.4 A, corresponding to 0.576 mJ, and the final average needs to be 2 A, corresponding to 0.4 mJ. It will take more than one cycle to decrease the current by the necessary amount, and 0.176 mJ must be removed.

Let $R_d$ 1114 have a resistance of 10Ω. While the control sequence is active, this disturbances pulls out additional energy at a rate of 14.4 W or 0.144 mJ per cycle. To remove energy equal to 0.176 mJ, the resistor $R_d$ 1114 needs to be connected for 12.2 µs. The actual time needed, however, is significantly less since the capacitor C 1110 gives up energy to the load during this process and needs to be restored. An estimate suggests that about 30 mJ should be left available for this purpose. Thus, the energy to be removed is closer to 0.144 mJ and may take about 10 µs to happen. The peak-to-peak ripple current before the line step is 146 mA and becomes 150 mA after the step disturbance. Based on linear ripple, the current at time 42 µs can be computed to be equal to 2.38 A. Since the active switch $q_1$ 1106 remains on the full cycle, through 50 µs, the current continues to fall to reach 2.14 A. To eliminate the disturbance transient, the current needs to drop to a minimum of 1.93 A at time of 60 µs. This will be accomplished if the active switch $q_1$ 1106 turns on at 50 µs and then off at 51.47 µs. To draw out the excess energy, the extra 10Ω load will be connected until the time of 52 µs. During this process, the augmented boost converter phase 1128 connects a five times large capacitor to the output to prevent excessive voltage excursion.

Figure 12:
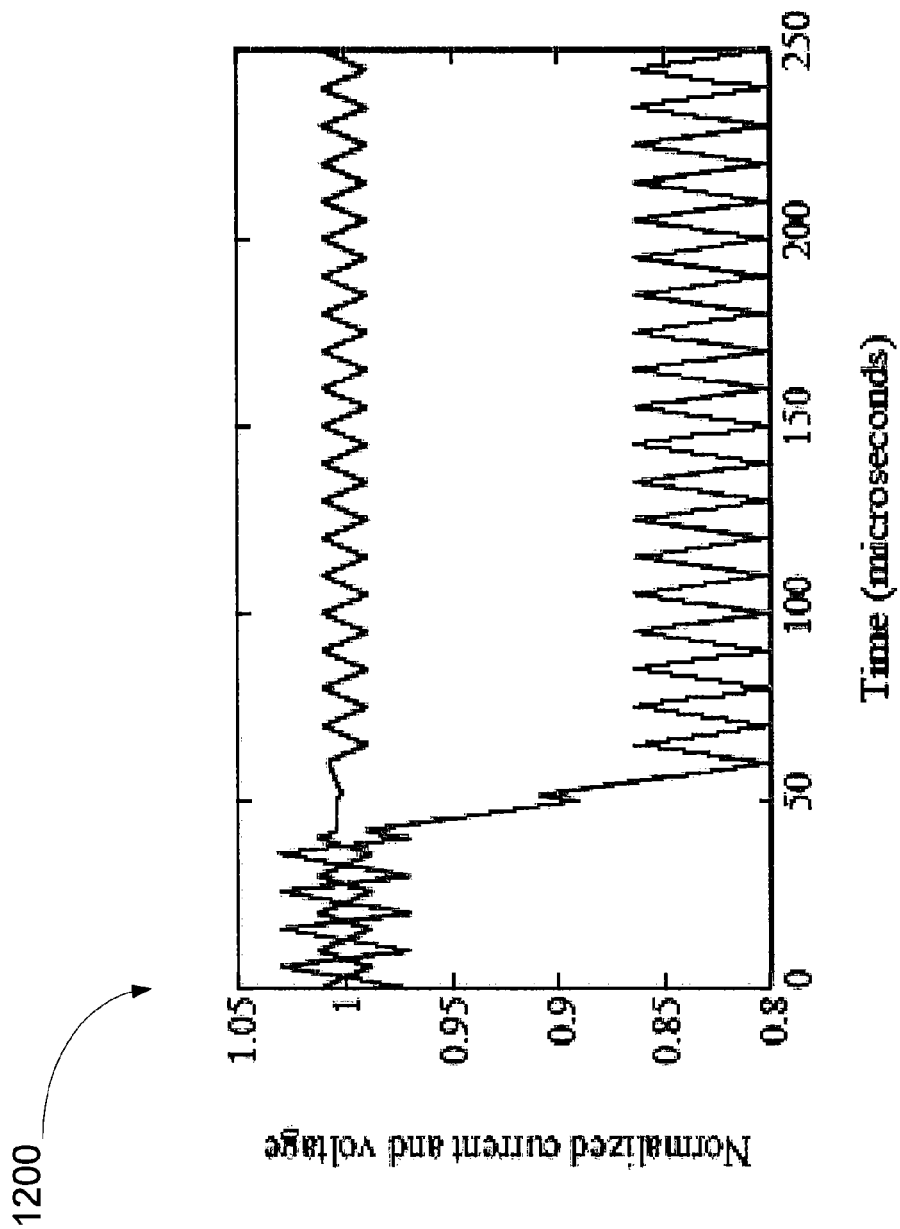
FIG. 12 is a graph illustrating responses of normalized current and output voltage for a step line increase in the boost converter of FIG. 11.
Figure 13:
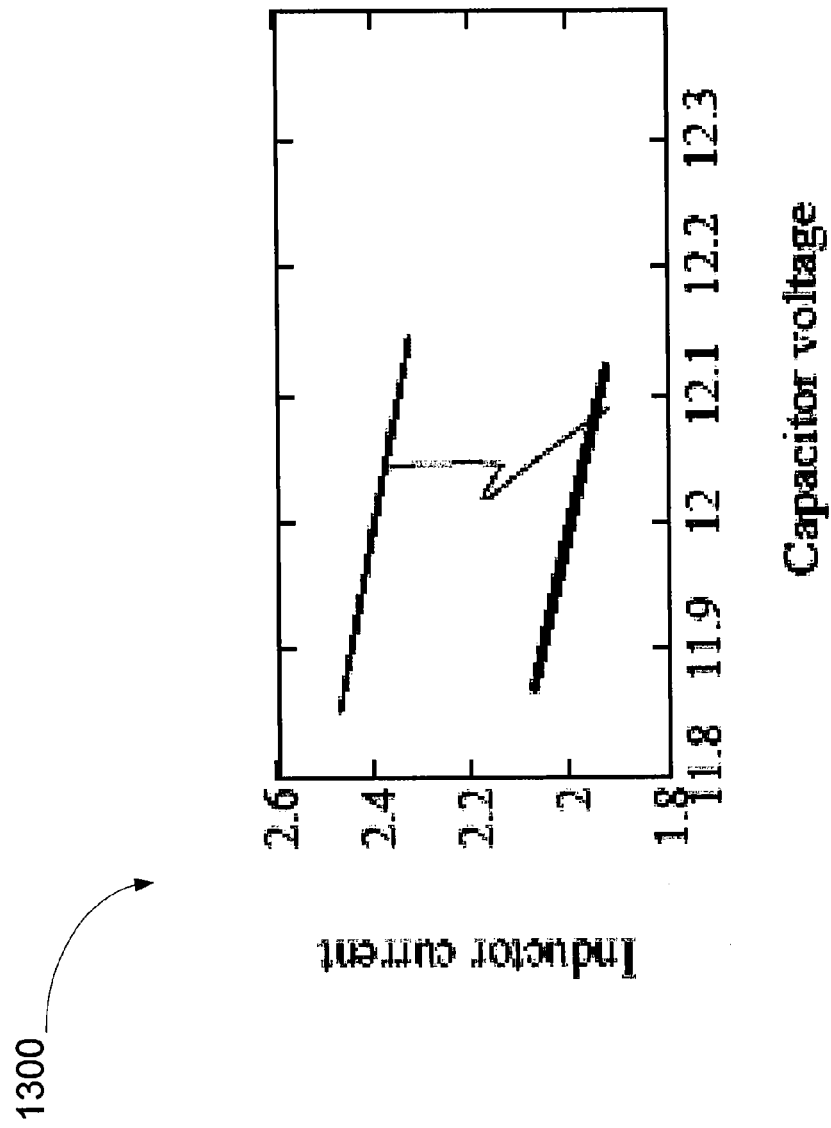
FIG. 13 is a graph illustrating a phase plane plot of an inductor current vs. a capacitor voltage for the step line increase of FIG. 12.

FIG. 12 shows time-domain results for this transient and control technique. The output remains within the ripple band throughout the response. The control has achieved a null response to a step line increase in the boost converter 1100. FIG. 13 shows the corresponding phase plane plot. The resistor $R_d$ 1114 supports a direct vertical path from the initial limit cycle to a point very close to the final cycle.

Figure 14:
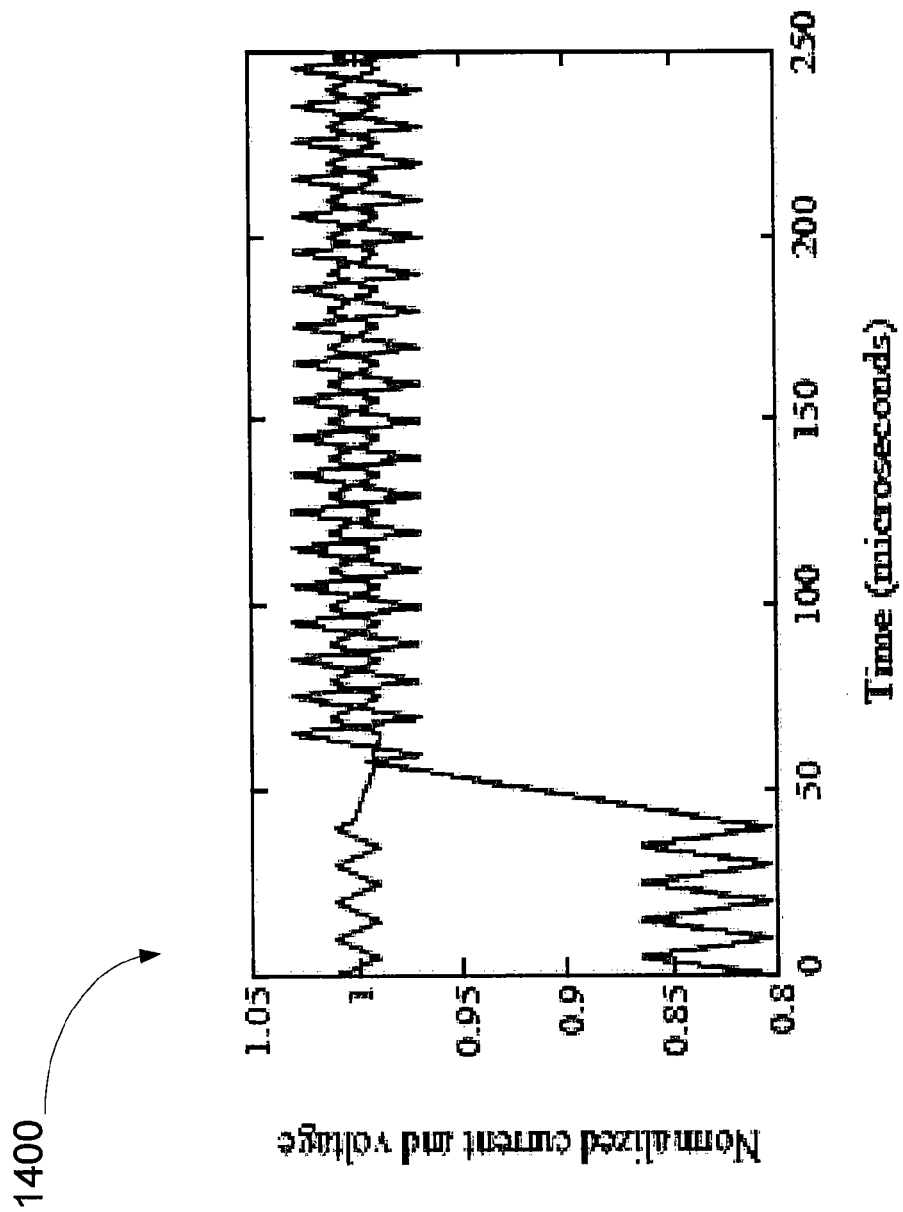
FIG. 14 is a graph illustrating responses of a normalized current and voltage for a step line decrease in the boost converter of FIG. 11.

For a line decrease from 6 V to 5 V, it is necessary to add energy to the inductor L 1104. With the 6 V input, the inductor current is at 1.99 A at t=42 µs, but needs to reach 2.33 A at the beginning of a period. When the input changes to 5 V, the inductor at 25 kA/s when the active switch $q_1$ 1106 is on. If the active switch $q_1$ 1106 is left on to the end of the period, the current remains low at 2.19 A. As in the line increase case, more control may need to be performed during the next cycle to reach 2.33 A at 60 µs. This will be the case if the active switch $q_1$ 1106 turns off at 58.2 µs. FIG. 14 shows the time domain response, given an augmented phase with ten times the converter capacitance. The extra capacitor $C_{aug}$ 1126 is switched out with the active switch $q_1$ 1106 at 65.8 µs to bring the instantaneous output voltage close to its minimum. This in turn is close to that on the final limit cycle.

No experienced designer would try to apply a boost converter to a fast load step (especially an increase) because of the slow dynamics. To illustrate the methods of the present invention, the long-felt need to produce a boost converter with fast load step response is to be carried out: the boost converter 1100 is subjected to a load step to 200% with unlimited slew rate, while the input voltage is 5 V. The rated ripple band is set at 2%. The augmentation is an additional boost phase with a high capacitance. In this case, the inductor average current must increase from 2.4 A to 4.8 A. Since the slew rate limit is just 25 kA/s, the active switch needs to stay on for 96 µs to bring the current up. During this interval of nearly ten periods, the load must be held up by the extra capacitance. Since this time duration is about 40 times the steady-state interval, the capacitor $C_{aug}$ 1126 need to be about 40 times the nominal value to support this extreme change.

The strategy in this example proceeds as follows:

A load step is detected at 42 µs. Immediately the extra or augmentation switch $q_{aug}$ 1122 is switched in parallel and the active switch $q_1$ 1106 is set to remain on.

The active switch $q_1$ 1106 stays on for 96 µs, through a time of 138 µs, then turns off and reverts to the steady-state value.

The augmentation phase switches $q_{aug}$ 1122 out at 145.8 µs, coinciding with the capacitor voltage minimum, to complete the recovery process.

Figure 15:
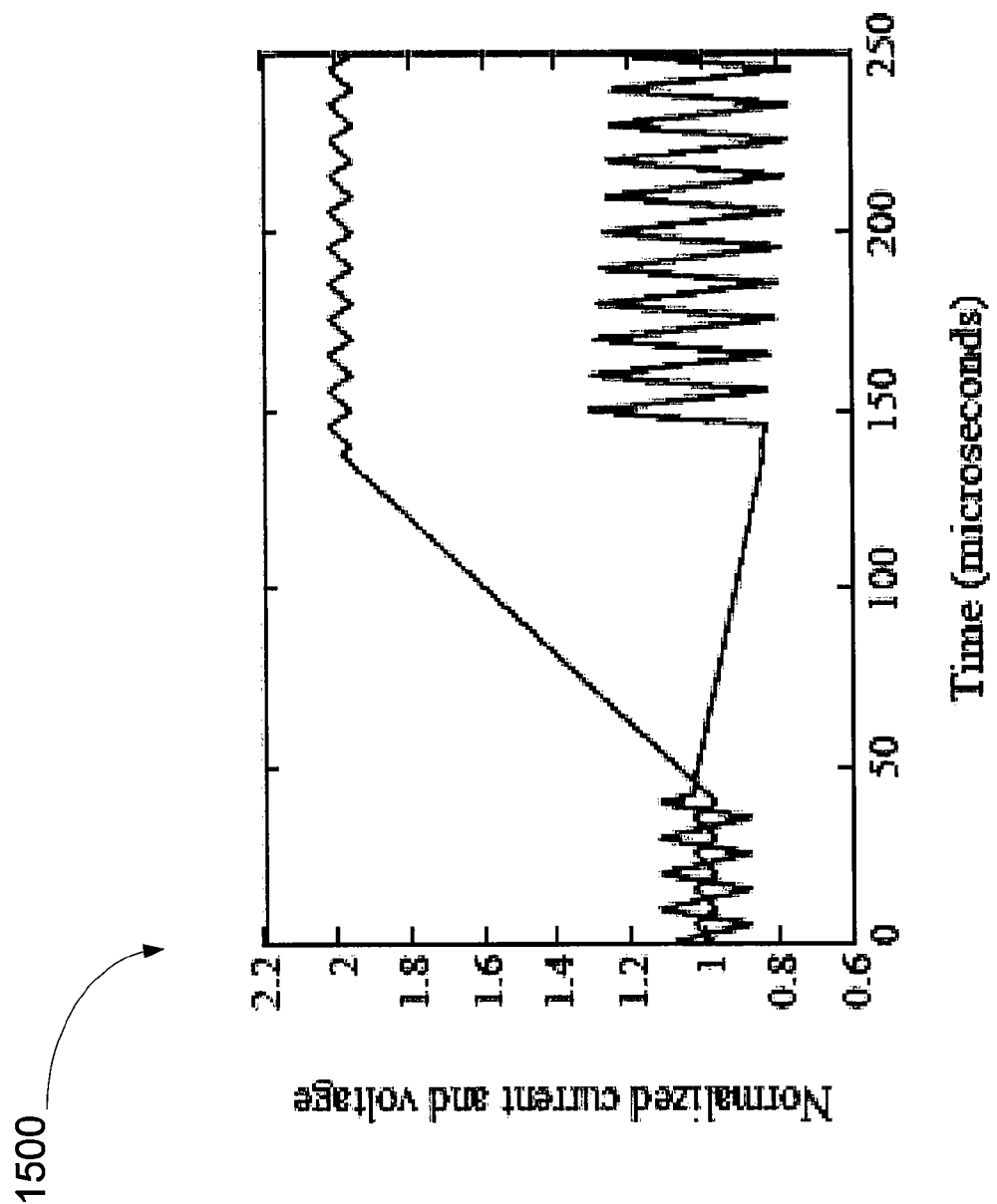
FIG. 15 is a graph illustrating responses of a normalized current and voltage for a load increase in the boost converter of FIG. 11.
Figure 16:
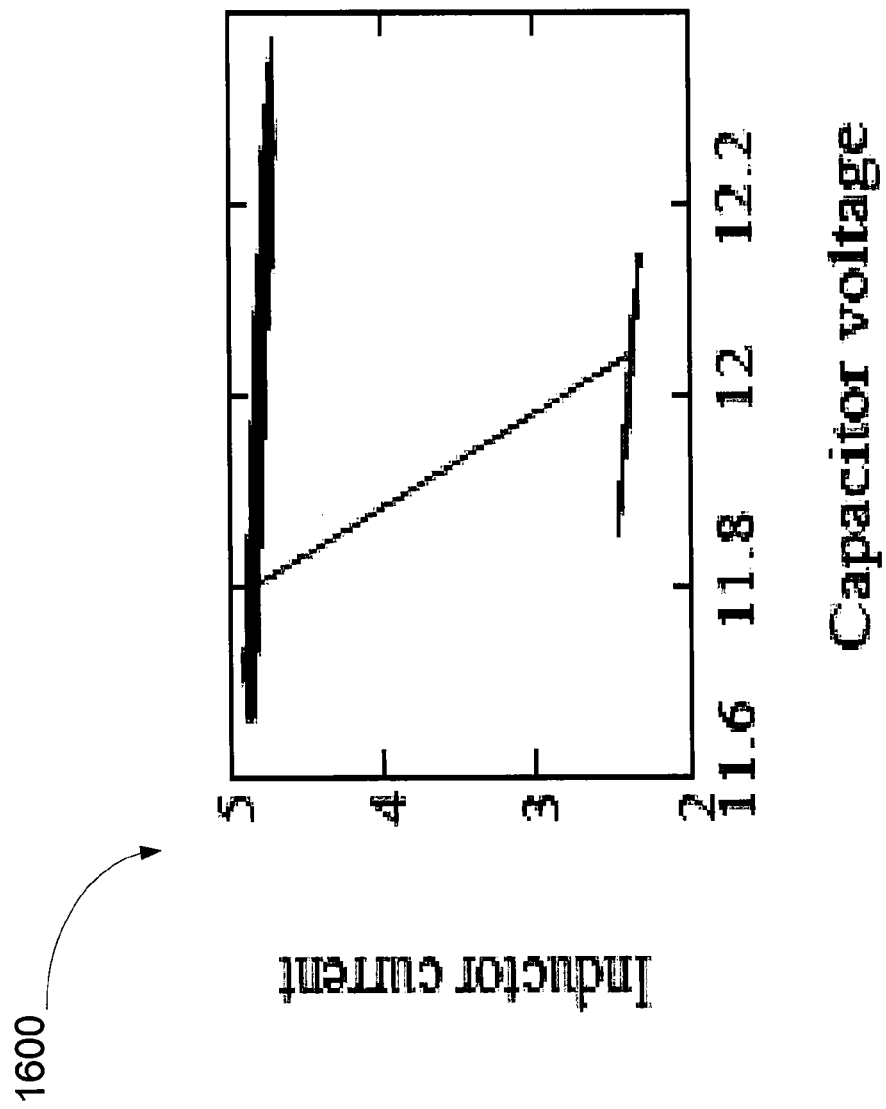
FIG. 16 is a graph illustrating a phase plane plot of an inductor current vs. a capacitor voltage for the load increase of FIG. 15.

FIG. 15 shows the time response for this case, while FIG. 16 shows the corresponding phase plane plot. The strategy successfully enforces a null response to this extreme load disturbance.

As stated above, effective transient suppression methods need to distinguish between voltage ripple and disturbances, quantities that both depend on the connected load. The energy storage in a power converter depends on desired voltage and current ripple. When ripple has a fixed amplitude and frequency, the converter is said to have reached steady-state operation.

As discussed above, a transient is a signal in response to a disturbance that overshoots or undershoots desired steady-state values. Further, transients are characterized by settling time, which is the duration between steady-state operations, and peak overshoot and undershoot, the amount voltages exceed the desired ripple band. Disturbances can occur at least at three locations in a power converter. The change can occur within the control when a reference change is initiated or from an unintended measurement spike, at the system input from a change in line voltage, and at the output side from fixed or varying loads connecting and disconnecting from the bus. Hereafter, load-induced transients, modeled as discrete resistive steps, are discussed, and the techniques presented can also apply to control or input disturbances.

Power supplies for multiple loads typically implement single or multiple voltage regulators to sustain a bus voltage. When various loads connect or disconnect from the bus, energy storage elements become imbalanced and produce output transients. Load steps as modeled here contain both timing and resistance information. Timing is defined as the instance knowledge and the extent by impedance knowledge. This simplistic view about a load creates four possible scenarios, which are as follows:

Case A: unknown impedance, unknown instance.
Case B: unknown impedance, known instance.
Case C: known impedance, unknown instance.
Case D: known impedance, known instance.

Impedance knowledge provides the information necessary for calculating steady state values, important for the design of high performance geometric controllers. Instance knowledge indicates when model estimates must change and when transients begin. Examples where such knowledge is available are given herein with particular emphasis on extreme cases, A and D. The last case D, in which both impedance and instance are known at the instant of disturbance and a transient is handled immediately and precisely, is ideal.

Many high-performance control schemes rely on knowledge about the system and implement some system parameters or entire estimated models generated on or offline. Although power converters rarely make use of load knowledge and may seem blind when it comes to identifying loads, realistic converters have access to some basic knowledge related to the design process. All converters can handle a maximum power output, which determines a minimum load resistance. Thus all converters are intended to operate over a known range of possible loads and have two design options. Control can either be designed for a single load impedance, with stability ensured for the range of possible impedances, or the controller can identify the load and adjust accordingly. With geometric control and corresponding switching surfaces, adjustment becomes a feasible option.

Geometric control directs state trajectories with a switching surface that separates the state plane into on and off regions. Hysteresis control, for example, uses a switching surface based on a single measurement to achieve desired steady-state operation. Other switching surfaces can be selected to achieve a specific transient performance. High-performance controls can be implemented with complicated surfaces constructed from load-dependent system parameters. Some impedance knowledge is necessary for designing higher-order surfaces for geometric controllers, and for identifying transients in augmented converter control.

Power converters function as piecewise-linear (PWL) systems. It is challenging to find the load impedance of a converter since the converter changes structure for different switch configurations. Fast-switching converters behave as single input single output (SISO) systems, and their average models can be linearized to support known identification schemes, such as recursive least-squares. Typical estimation schemes estimate a model from previous samples and need a persistent input excitation to identify parameters. When sampling is faster than the switching frequency, each switch action provides a persistent excitation and each PWL system can be identified. Regardless of the identification method, there are two counteracting goals in transient suppression. A first goal, handling disturbances, implies identifying system parameter changes quickly. This is difficult, and in addition the control actions change the system. A second goal, fast parameter convergence, implies spectrum-rich input disturbances, but these create more transients. Identification schemes can greatly benefit from external knowledge, as will be discussed in later cases. Without full load knowledge some sacrifices must be made.

Figure 17:
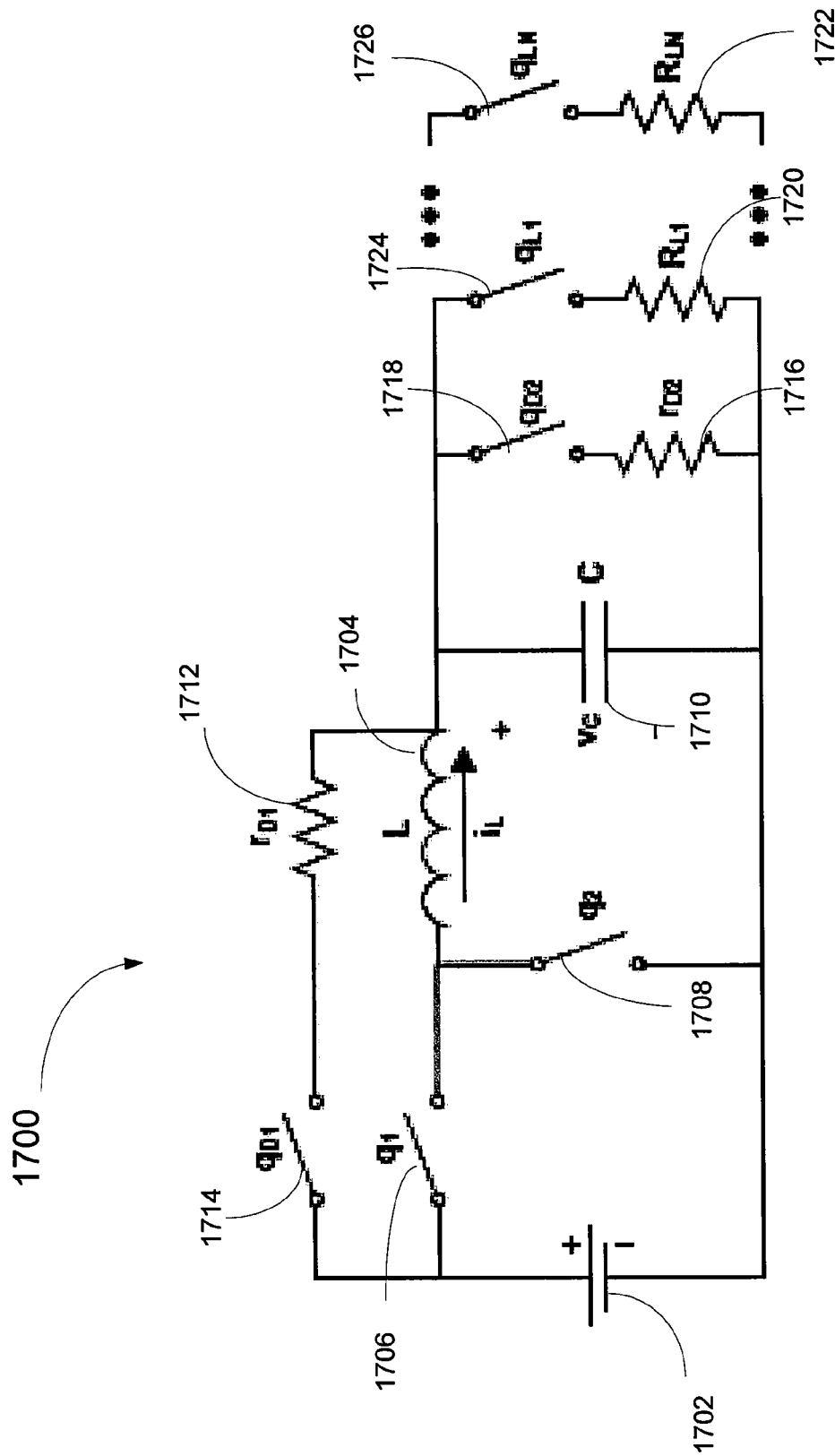
FIG. 17 is a circuit diagram illustrating another embodiment of an augmented buck converter in accordance with the present invention.

One identification method is to consider any voltage outside the maximum load ripple band to be a transient. This creates three geometric regions. The middle region is centered about the desired output voltage with a height equal to the maximum possible ripple. The lower region contains voltage undershoots, experienced when the load increases and the POL converter needs more power. The upper region classifies voltage overshoot, experienced when the load decreases and the POL converter is attempting to deliver too much power. This simple scheme identifies both instance knowledge and the sign of the impedance change. These two items provide information necessary to activate the damper resistors on the augmented converter. This scheme has been tested in hardware and compared against the standard topology Now referring to FIG. 17, another example of an augmented buck converter 1700 is illustrated. As shown, a switching element $q_1$ 1706 is connected at the output of an energy source unit Vin 1702, an inductor element L 1704 is connected in series between the switching element $q_1$ 1706 and a capacitor C 1710, and a switch $q_2$ 1708 is connected in parallel with the energy source unit Vin 1702 and the switching element $q_1$ 1706. A resistor $R_{D1}$ 1712 is connected in parallel with the inductor element L 1704 via a switch $q_{D1}$ 1714. A capacitor C 1710 is connected at the output of the inductor element L 1704 and in parallel with a resistor $R_{D2}$ 1712 via a switch $q_{D2}$ 1714. In addition, a plurality of load or damper resistors $R_{L1}$ to $R_{LN}$, with N being a integer greater than 1, are connected in parallel to the resistors $R_{D2}$ 1712 via a plurality of corresponding switches $q_{L1}$ to $q_{LN}$.

Figure 18:
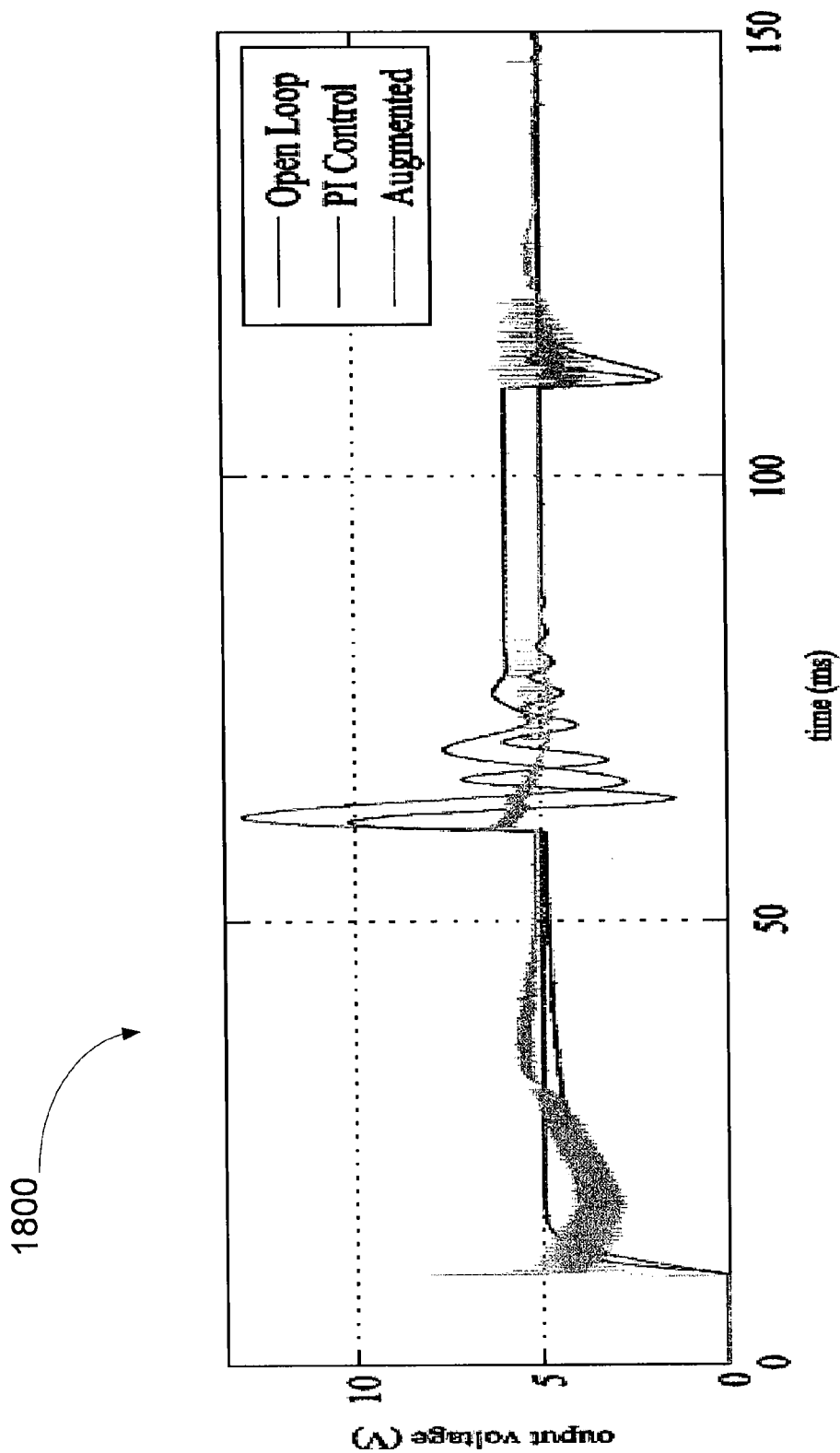
FIG. 18 is graph illustrating a voltage output from reference step, 1Ω to 50Ω, and 50Ω to 1Ω load steps.

The performance of the augmented buck converter 1700 was tested in hardware and compared to a standard buck converter. All control code and switching signals were generated on a F2812 DSP target for Simulink®. All the converters underwent a reference step at 10 ms, followed by a 1-to-50Ω load decrease at 60 ms, and finally a 50-to-1Ω load increase at 110 ms. The voltage error and location of the geometric regions controlled the switching signals into $q_{D1}$ and $q_{D2}$. The voltage output was compared to open-loop and proportional-integral (PI) feedback loop responses, as shown in FIG. 18. The augmented buck converter 1700 when compared to the regular PI controlled buck had 45% and 31% less peak undershoot and overshoot from load steps, respectively. The high-side damper provided 300 times quicker rise time, faster than the digital signal processing (DSP) sampling capabilities, and caused some overshoot at the start. More load knowledge can help identify transients faster and further improve performance, as will be discussed below.

While knowing everything about a load is ideal, it may not be practical, especially for more complicated loads and systems. Consider a computer power system with all its peripherals and processors. These items are electrically connected to the motherboard, which has instance knowledge from clock and data signals but lacks impedance knowledge. While the controller can try to identify the load, this takes time, which is where the external instance knowledge provides a key advantage. Instance knowledge can reduce load identification time and handle transients before they reach steady state. Most identification methods use previous input and output samples to create an estimated model. When loads change, the estimated model becomes invalid and must be recalculated. The time lost in refilling the buffer with valid samples is time lost in reacting to transients. However, instance knowledge immediately indicates invalid model estimates and can trigger the loading of more relevant samples, such as those measured when that load was last enabled. If the converter had future reference knowledge, it could precharge the inductor and reduce rise time by an order of magnitude. Impedance knowledge provides the means to identify transients by providing a way to compute the new steady-state operating point.

Modern digital systems provide opportunities for sending load information to POL converters. Inexpensive microcontrollers and their rich communication options have greatly aided this task. Although the controllers have available communication channels, it is not clear how the channels can be used for interaction with a power converter. Most loads are unintelligent in the sense that they change without identifying information or prior notice. However, with modest effort, a designer or local controller can identify possible load impedance changes in advance. Load-enabling pulses can identify the instance. The advantage of impedance and instance knowledge will be demonstrated by applying the correct damper resistance value, without analog measurements, at the moment of disturbance, such that the disturbance is completely eliminated.

Consider a system in which a central controller manages deterministic loads. An example could be a servo-controlled manufacturing process, where a central control is responsible for precisely timing each motor position and activation sequence. Instance knowledge comes from the central controller, since it enables the loads. Impedance knowledge could come from measurements taken beforehand or from servo datasheets.

A known impedance and instance scenario was created in hardware to demonstrate how the augmented converter 1700 can harness knowledge and null load-step induced transients. A standard and augmented buck with identical L and C were compared by stepping in 5 or 50Ω loads after 5 ms and observing their output voltage transients. Both converters operated in open-loop in the sense that the active switch, $q_1$, had a constant duty cycle, and both had an unregulated 10 V output. The damper resistors $R_{L1}$ to $R_{LN}$ of the augmented converter 1700 were adjusted with load-dependant switching functions calculated from known loads. The rising (falling) edge of load-enable switch $q_{L1}$ ($q_{LN}$) provided instance information for the damper resistors $R_{L1}$ to $R_{LN}$. Damper switch $q_{D2}$ was driven with a decaying duty-cycle ramp and initialized by the rising edges of the 50Ω load-enable signals. The ramp initial duty cycle depended on load size; its decay depended on subsequent load step and resistor dissipation limits. The ramp function was simple and worked well in canceling transients; better suited ones may reduce ripple. The same damping procedure was applied to $q_{D1}$ for high-to-low resistance steps.

Figure 19:
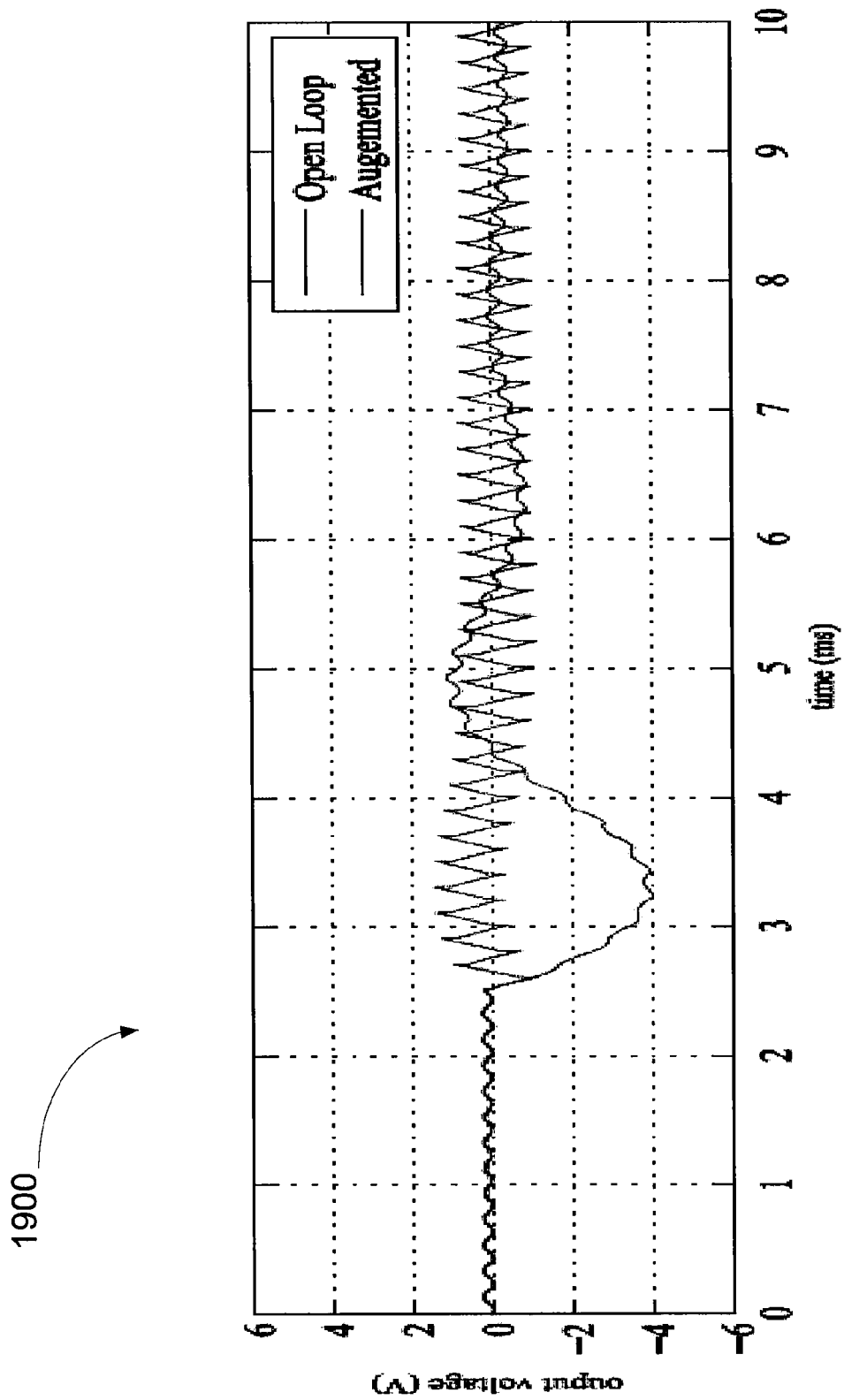
FIG. 19 is a graph illustrating an AC coupled transient comparison for 50Ω to 5Ω resistance steps at 10 V output.
Figure 20:
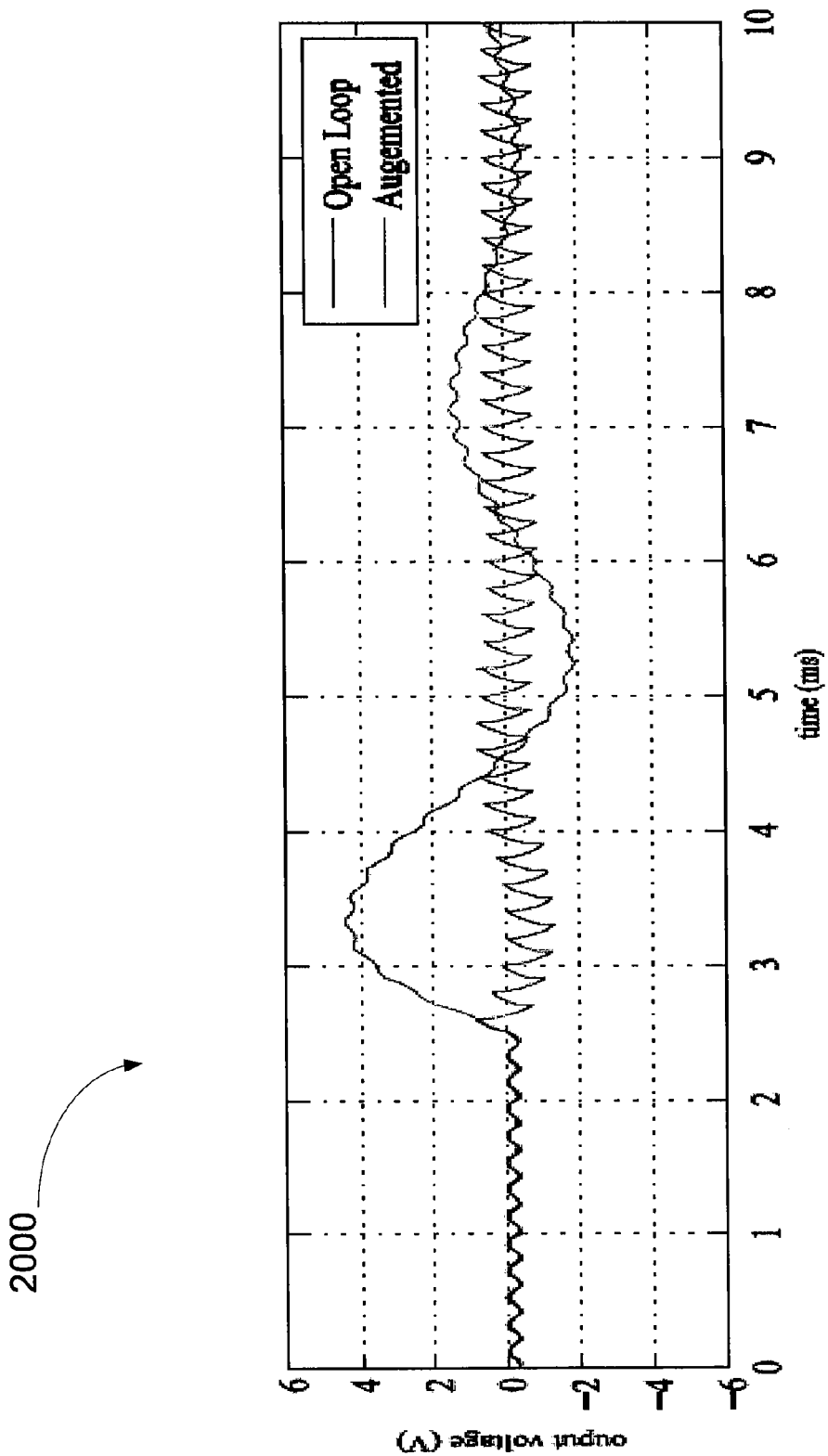
FIG. 20 is a graph illustrating an AC coupled transient comparison for 5Ω to 50Ω resistance steps at 10 V output.

The ac-coupled output voltage for the 5-to-50Ω load step is shown in shown in FIG. 19 and the 50-to-5Ω load step in FIG. 20. At the load event, access energy in the inductor L 1704 is dumped into the load and the capacitor C 1710. This creates a transient that overshoots the desired output voltage. When resistance steps from high-to-low, current drains off C and is held back by the inductor L 1704. This creates a transient that undershoots the desire output voltage. The standard buck cannot prevent system energy shortages or surpluses from affecting the output. However, with an augmented configuration and knowledge about load events, current can bypass energy storage bottlenecks and go directly to the load.

The damper resistor solution is advantageous for relatively infrequent load steps, since paths need only handle peak power ratings rather than continuous ratings. This leads to a more compact solution than using passive filters. The disturbance frequency becomes both a limiting factor and an important design specification. Damper resistors $R_{L1}$ to $R_{LN}$ also work for variable input and output voltages and have higher temperature tolerances than most passive clamps. When load steps are frequent, damping resistors reduce converter efficiency since they dissipate energy when active. A lossless alternative would replace damper resistors with a tank circuit when load changes are fast and frequent, or with a low-power dc-dc converter when slow and infrequent.

Energy storage elements define performance bottlenecks in power converters. The need to change energy storage levels causes load-induced voltage transients. Even the most aggressive control schemes cannot circumvent fundamental limitations in basic converter topologies. The present invention shows how to add current routes around storage elements with augmented converters. Added conduction paths could compensate load power. Boost and buck topologies were compared to conventional converters as examples. Sufficient load knowledge allowed the controller to identify a load change and completely cancel voltage overshoots.

Thus, a combination of energy path augmentation and geometric control has been shown to provide the possibility of null response to line or load changes. Geometric controls based on switch timing and energy requirements offer dynamic performance far beyond those imposed by the switching frequency.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A method for determining energy changes using a power converter to minimize an impact of a disturbance, the power converter having energy storage elements and switching elements, the method comprising:
    determining a nature of the disturbance;
    evaluating an amount of energy to be added or removed based on the disturbance determination; and
    based on the evaluated amount of energy to be added or removed, determining an operating sequence of the switching elements using a computer processor, wherein the operating sequence provides a sequencing of the switching elements, and switching times and operating durations of each of the switching elements in the power converter based on available energy levels of the energy storage elements before and during the addition or removal of the evaluated amount of energy, thereby minimizing the impact of the disturbance on outputs of the power converter.

2. The method according to claim 1, further comprising:
    determining which ones of the internal storage elements to utilize; and
    determining whether an operating status of each of the switches switching elements associated with the internal storage elements determined to be utilized need to be modified.

3. The method according to claim 2, wherein the step of determining which ones of the internal storage elements to utilize comprises:
  determining that augmenting the power converter with a load is needed for energy removal.

4. The method according to claim 1, further comprising:
  augmenting the power converter with an additional path between the input and the output of the power converter.

5. The method according to claim 4, wherein the path augmentation of the power converter provides energy removal and improves a response time to the disturbance.

6. The method according to claim 4, wherein the additional path provides a parallel phase of the power converter configured for energy storage and for managing energy during transients resulting from the disturbance.

7. The method according to claim 1, further comprising:
  determining a post-disturbance steady state current and current ripple band, and wherein the operating sequence serves to reach the post-disturbance steady state current.

8. The method according to claim 1, further comprising:
  determining a post-disturbance steady state voltage and voltage ripple band, and wherein the operating sequence serves to reach the post-disturbance steady state voltage.

9. A non-transitory computer storage readable medium comprising instructions which when executed by a computer system causes the computer to implement a method for determining energy changes using a power converter to minimize an impact of a disturbance, the power converter having one or more energy storage elements and switching elements, the method comprising:
  determining a nature of the disturbance;
  evaluating an amount of energy to be added or removed based on the disturbance determination; and
  based on the evaluated amount of energy to be added or removed, determining an operating sequence of the switching elements, wherein the operating sequence provides a sequencing of the switching elements, and switching times and operating durations of each of the switching elements by the power converter based on the available energy levels of the energy storage elements before and during the addition or removal of the evaluated amount of energy, thereby minimizing the impact of the disturbance on outputs of the power converter.

10. The non-transitory computer storage readable medium according to claim 9, further comprising:
  determining which ones of the internal storage elements to utilize; and
  determining whether an operating status of each of the switching elements associated with the internal storage elements determined to be utilized needs to be modified.

11. The non-transitory computer storage readable medium according to claim 10, wherein the step of determining which ones of the internal storage elements to utilize comprises:
  determining that augmenting the power converter with a load is needed for energy removal.

12. The non-transitory computer storage readable medium according to claim 9, further comprising:
  augmenting the power converter with an additional path between the input and the output of the power converter.

13. The non-transitory computer storage readable medium according to claim 12, wherein the path augmentation of the power converter provides energy removal and improves a response time to the disturbance.

14. The non-transitory computer storage readable medium according to claim 12, wherein the additional path provides a parallel phase of the power converter configured for energy storage and for managing energy during transients resulting from the disturbance.

15. The non-transitory computer storage readable medium according to claim 9, further comprising:
  determining a post-disturbance steady state current and current ripple band, and wherein the operating sequence serves to reach the post-disturbance steady state current.

16. The non-transitory computer storage readable medium according to claim 9, further comprising:
  determining a post-disturbance steady state voltage and voltage ripple band, and wherein the operating sequence serves to reach the post-disturbance steady state voltage.

* * * * *